(12) United States Patent
Jones

(10) Patent No.: US 10,976,833 B2
(45) Date of Patent: Apr. 13, 2021

(54) NON-QWERTY KEYBOARD

(71) Applicant: Nolan Jones, Greensboro, NC (US)

(72) Inventor: Nolan Jones, Greensboro, NC (US)

(*) Notice: Subject to any disclaimer, the term of this patent is extended or adjusted under 35 U.S.C. 154(b) by 30 days.

(21) Appl. No.: 16/297,792

(22) Filed: Mar. 11, 2019

(65) Prior Publication Data

US 2019/0278382 A1  Sep. 12, 2019

Related U.S. Application Data

(60) Provisional application No. 62/641,381, filed on Mar. 11, 2018.

(51) Int. Cl.
*G06F 3/02* (2006.01)
*G06F 3/023* (2006.01)

(52) U.S. Cl.
CPC .......... *G06F 3/0219* (2013.01); *G06F 3/0233* (2013.01)

(58) Field of Classification Search
CPC .... G06F 3/0233; G06F 3/018; G06F 3/04886; G06F 3/0219; G06F 2203/04803
See application file for complete search history.

(56) References Cited

U.S. PATENT DOCUMENTS

| | | |
|---|---|---|
| 3,929,216 A | 12/1975 | Einbinder |
| 6,657,560 B1 | 12/2003 | Jung |
| 8,459,885 B2 | 6/2013 | Min |
| 2010/0271241 A1* | 10/2010 | Weller ............... G06F 3/0219 341/22 |
| 2012/0113007 A1 | 5/2012 | Koch et al. |
| 2013/0057475 A1 | 3/2013 | Duggan et al. |
| 2013/0067387 A1* | 3/2013 | Kim ................ G06F 3/04886 715/780 |
| 2019/0187891 A1* | 6/2019 | Davis ............... G06F 3/04886 |

FOREIGN PATENT DOCUMENTS

| | | |
|---|---|---|
| KR | 20110129090 A | 12/2011 |
| KR | 20140024794 A | 3/2014 |
| KR | 20140095227 A | 8/2014 |

* cited by examiner

*Primary Examiner* — Yaron Cohen
(74) *Attorney, Agent, or Firm* — NK Patent Law

(57) ABSTRACT

A keyboard is configured for inputting letters of an alphabet into a computing device. The keyboard has a left-side keyboard section and a right-side keyboard section. The left-side keyboard section comprises a left-side cluster of letter keys formed from letter keys in multiple different left-side rows, including a left-side top row and a left-side bottom row that each has only a single letter key. Letter keys forming a perimeter of the left-side cluster are arranged around the perimeter in alphabetical order according to said alphabet. Similarly, the right-side keyboard section comprises a right-side cluster of letter keys formed from letter keys in multiple different right-side rows, including a right-side top row and a right-side bottom row that each has only a single letter key. Letter keys forming a perimeter of the right-side cluster are arranged around the perimeter in alphabetical order according to said alphabet.

20 Claims, 28 Drawing Sheets

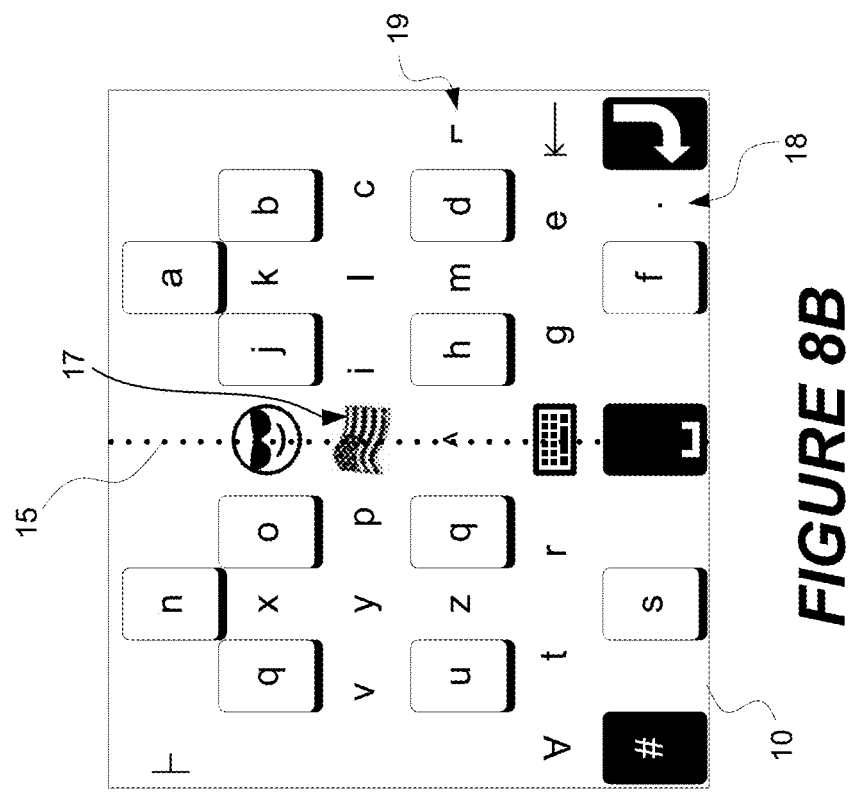
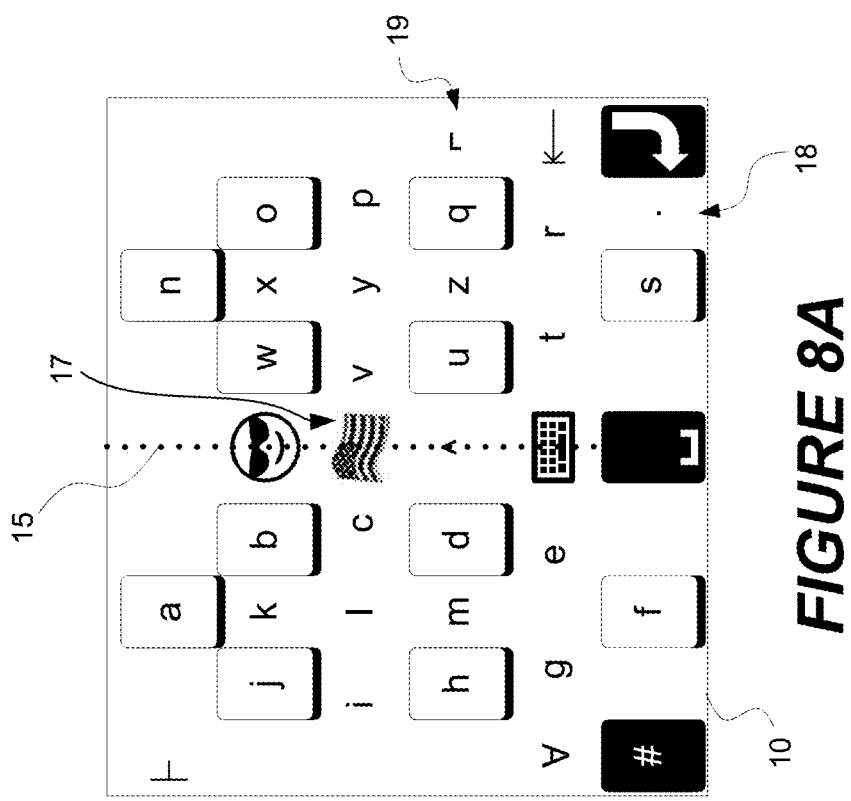
*FIGURE 8B*
*FIGURE 8A*

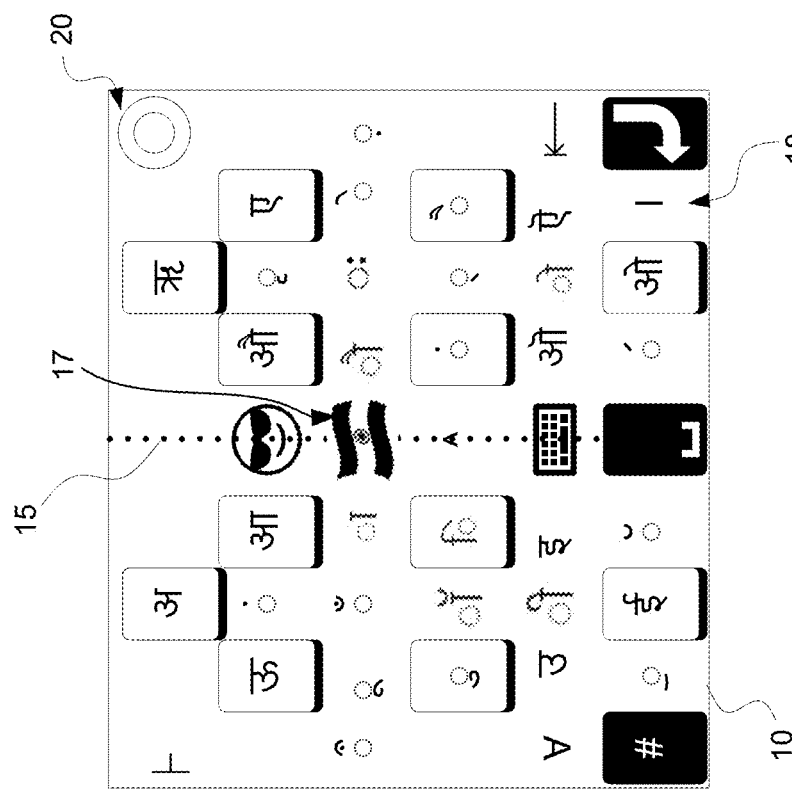
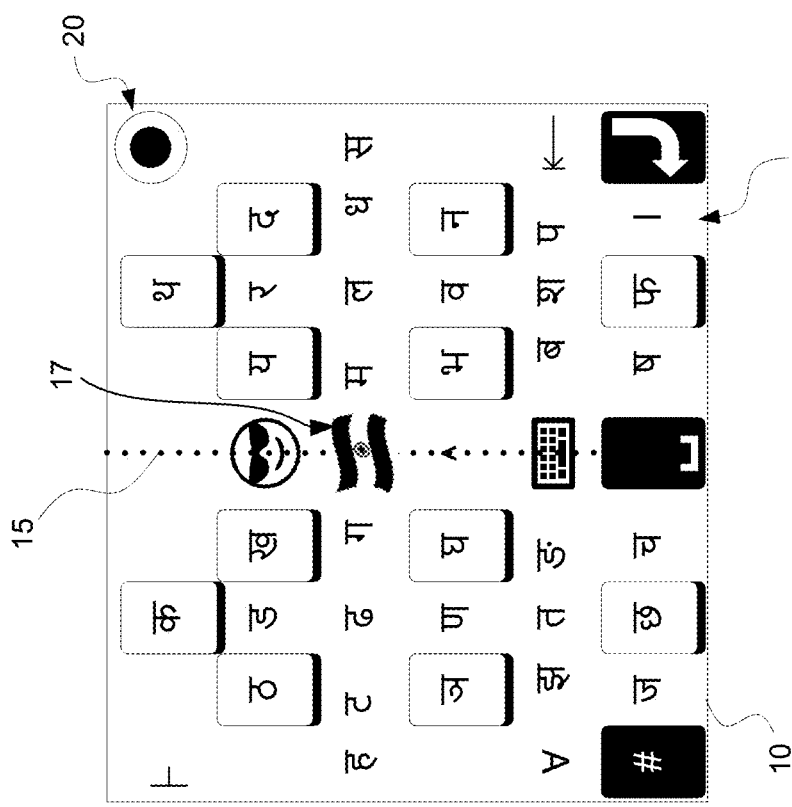

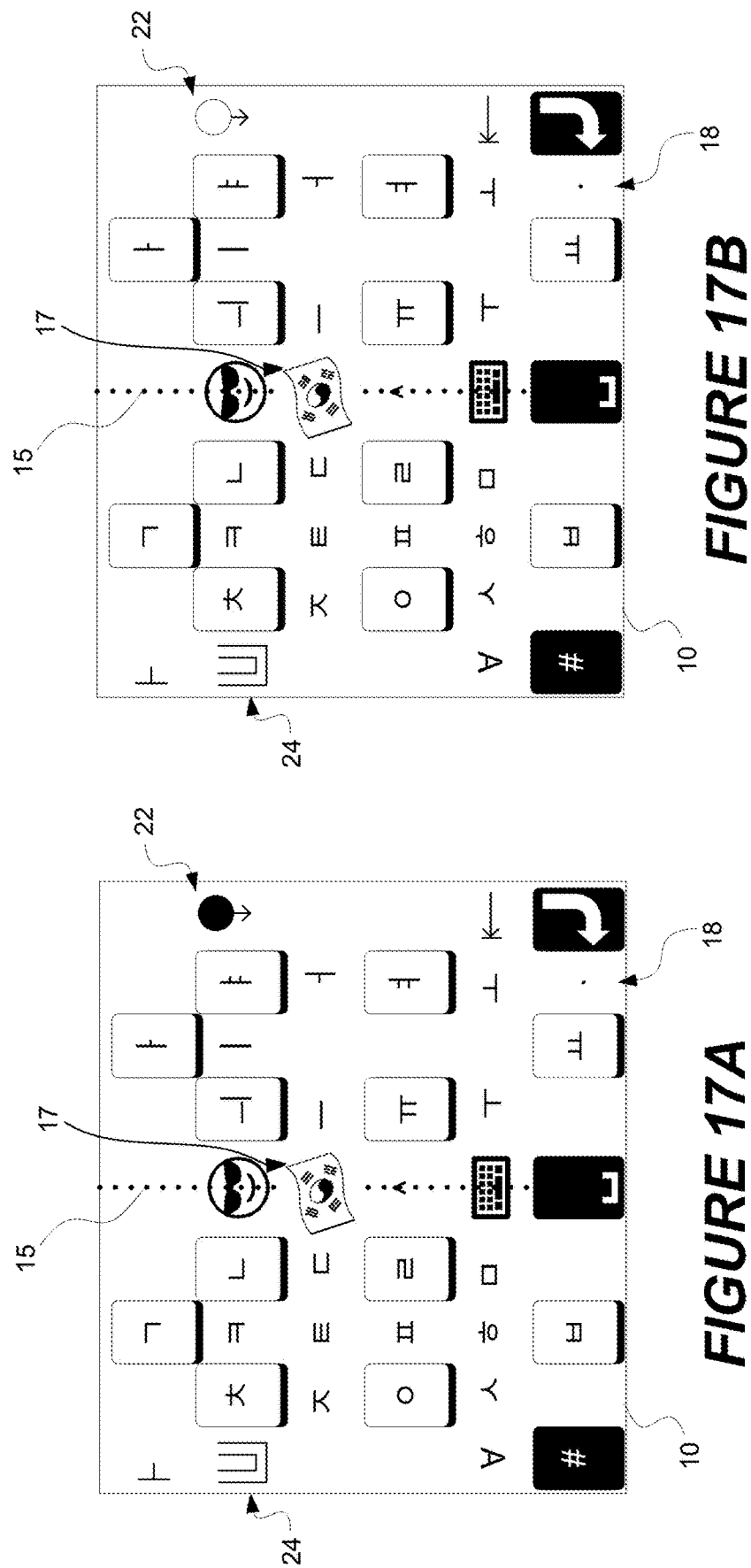

|    | c0 | c1 | c2 | c3 | c4 | c5 | c6 | c7 | c8 |
|----|----|----|----|----|----|----|----|----|----|
| r1 |    | a  |    |    |    |    | n  | o  |    |
| r2 |    | j  | k  | b  | 🕿 | w  | x  | y  | p  |
| r3 |    | i  | l  | c  |    | v  |    |    | q  |
| r4 |    | h  | m  | d  | <  | u  | z  |    |    |
| r5 |    | g  |    | e  | ⌨  | t  |    | s  | ↓ ↵ |
| r6 |    | ⇧  | #  | f  | sp |    |    | .  |    |

FIGURE 21A

|    | c0 | c1 | c2 | c3 | c4 | c5 | c6 | c7 | c8 |
|----|----|----|----|----|----|----|----|----|----|
| r1 |    | 1  | 2  | 3  | +  |    | $  |    | #  |
| r2 |    | 4  | 5  | 6  | -  | ð  | €  | *  | *  |
| r3 |    | 7  | 8  | 9  | *  | £  | [  | <  | ]  |
| r4 |    | %  | 0  | =  | *  | {  | }  | #  | {  |
| r5 |    | ^  | &  | >  | /  |    |    | \  | @  |
| r6 |    | ⇧  | a  |    | sp |    |    | .  | ↓ ↵ |

FIGURE 21B

|    | c0 | c1 | c2 | c3 | c4 | c5 | c6 | c7 | c8 |
|----|----|----|----|----|----|----|----|----|----|
| r1 |    | :  | ;  | ,  |    | ◁  |    | n  | o  |
| r2 |    | -  | —  | _  |    | ▷  | ↑  | x  | p  |
| r3 |    | '  | "  | "  |    | ◊  | →  | y  | q  |
| r4 |    | ä  | ß  | ã  |    | ?  | ε  | z  |    |
| r5 |    |    | §  | ⇑  |    | ~  | )  | ᴍ  | ☺ |
| r6 |    | <  | >  | ∨  |    | sp | ʎ  | v  | ↵ |
|    |    |    |    |    | #  | a  |    | ↓  |    |

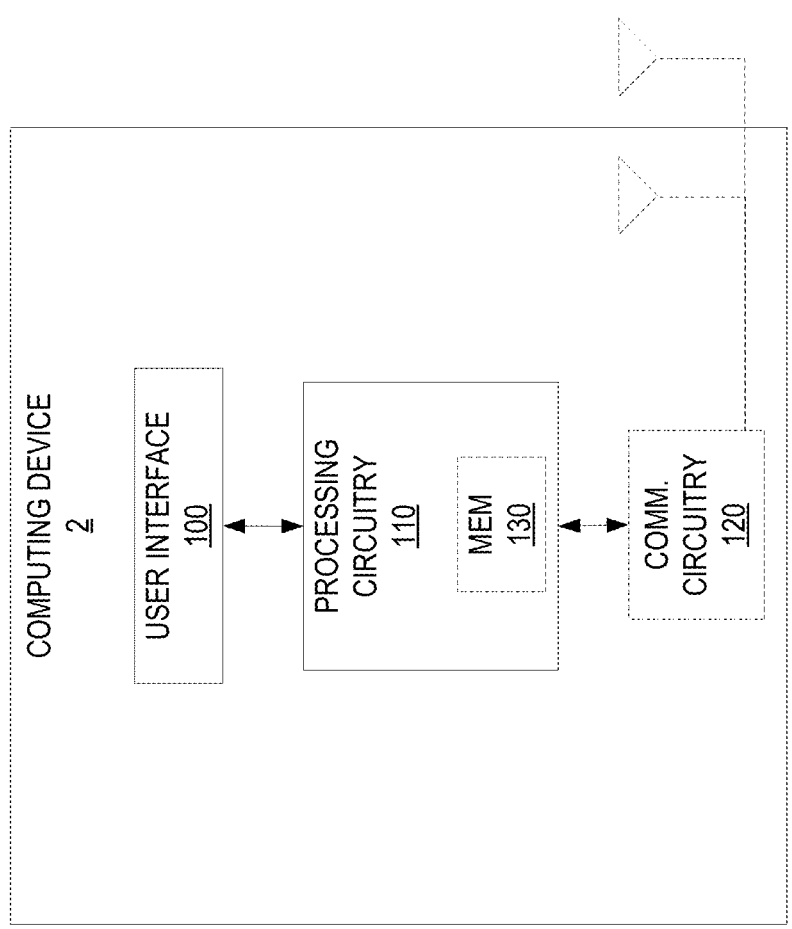

NON-QWERTY KEYBOARD

RELATED APPLICATIONS

The present application claims priority to U.S. provisional application Ser. No. 62/641,381, filed 11 Mar. 2018, the entire contents of which is incorporated herein by reference.

TECHNICAL FIELD

The present application relates generally to a keyboard, and relates more particularly to a non-QWERTY keyboard.

BACKGROUND

The QWERTY keyboard for Latin-script alphabets was first implemented in the 1870s as part of a mechanical typewriter. Placing commonly used letter-pairs so that their type bars were not neighboring, the QWERTY keyboard reduced typewriter jams. This popular QWERTY design persisted on modern keyboards, with only minimal changes, long after mechanical typewriter jams were no longer a problem. In fact, the QWERTY design has even persisted on virtual keyboards provided by mobile devices with a touchscreen.

The QWERTY keyboard is nonetheless inherently difficult to learn how to use. The non-intuitive arrangement of the letters on the keyboard not only steepens the keyboard's learning curve, but also threatens to slow typing speeds. This proves especially true when the QWERTY keyboard is used on mobile devices and other handheld devices whose small form factor dictates that a person use two thumbs, or one thumb and one finger, to type rather than the ten fingers for which the QWERTY keyboard's elongated footprint was designed.

SUMMARY

According to some embodiments, a keyboard is configured for inputting letters of an alphabet into a computing device. The keyboard has a left-side keyboard section and a right-side keyboard section. The left-side keyboard section comprises a left-side cluster of letter keys formed from letter keys in multiple different left-side rows, including a left-side top row and a left-side bottom row that each has only a single letter key. Letter keys forming a perimeter of the left-side cluster are arranged around the perimeter in alphabetical order according to said alphabet. Similarly, the right-side keyboard section comprises a right-side cluster of letter keys formed from letter keys in multiple different right-side rows, including a right-side top row and a right-side bottom row that each has only a single letter key. Letter keys forming a perimeter of the right-side cluster are arranged around the perimeter in alphabetical order according to said alphabet.

In some embodiments, inclusion of only a single character key in the top and/or bottom rows may effectively elongate the character key footprint in a vertical direction so as to advantageously mimic thumbprints of thumbs with which the keyboard is usable. Alternatively or additionally, arranging the character keys according to a standardized order of the writing system, e.g., so as to parallel a child's cognitive learning of that standardized order, may advantageously help expedite the process of learning how to type on the keyboard. Alternatively or additionally, some embodiments differentiate the character keys of different rows in terms of inter-letter spacing or the distance spanned by the character keys in order to advantageously cause the characters of the character keys on a cluster's perimeter to be arranged in an approximately oval, diamond, or other basic shape. Approximating such a basic shape on the keyboard that anyone can visually identify even at an early stage of mental cognitive development may help expedite learning how to type on the keyboard.

Other embodiments herein include a keyboard for inputting letters of an alphabet into a computing device. The keyboard has a left-side keyboard section and a right-side keyboard section. The left-side keyboard section comprises multiple different left-side rows. The left-side rows include: a left-side top row that has only a single character key; a left-side bottom row that has only a single character key, wherein the single letter key in each of the left-side top row and the left-side bottom row is centered on a left-side axis extending between the left-side top row and the left-side bottom row; and three or more left-side intermediate rows between the left-side top row and the left-side bottom row, wherein each left-side intermediate row has at least a left-side character key whose center is offset to the left of the left-side axis and a right-side character key whose center is offset to the right of the left-side axis. The right-side keyboard section comprises multiple different right-side rows. The right-side rows include: a right-side top row that has only a single character key; a right-side bottom row that has only a single character key, wherein the single letter key in each of the right-side top row and the right-side bottom row is centered on a right-side axis extending between the right-side top row and the right-side bottom row; and three or more right-side intermediate rows between the right-side top row and the right-side bottom row, wherein each right-side intermediate row has at least a left-side character key whose center is offset to the left of the right-side axis and a right-side character key whose center is offset to the right of the right-side axis.

Still other embodiments herein include the keyboard as described in any of the above embodiments, in physical or virtual form.

Further embodiments include computer programs and computer-readable storage mediums for providing the above keyboard embodiments.

BRIEF DESCRIPTION OF THE DRAWINGS

Further details of embodiments of the technique are described with reference to the enclosed drawings, wherein:

FIGS. 8A-8B are block diagrams of keyboards for an English language writing system according to some embodiments.

FIGS. 16A-16B are block diagrams of keyboards for a Modern standard Hindi language writing system according to some embodiments.

FIGS. 17A-17C are block diagrams of keyboards for a Korean language writing system according to some embodiments.

FIG. 21A is a block diagram of an alphabet keyboard according to some embodiments.

FIG. 21B is a block diagram of a numeric keyboard according to some embodiments.

FIG. 21C is a block diagram of a symbol keyboard according to some embodiments.

FIG. 21D is a block diagram of an emoji keyboard according to some embodiments.

FIG. 22 is a block diagram of a computing device according to some embodiments.

DETAILED DESCRIPTION

Figure 1:
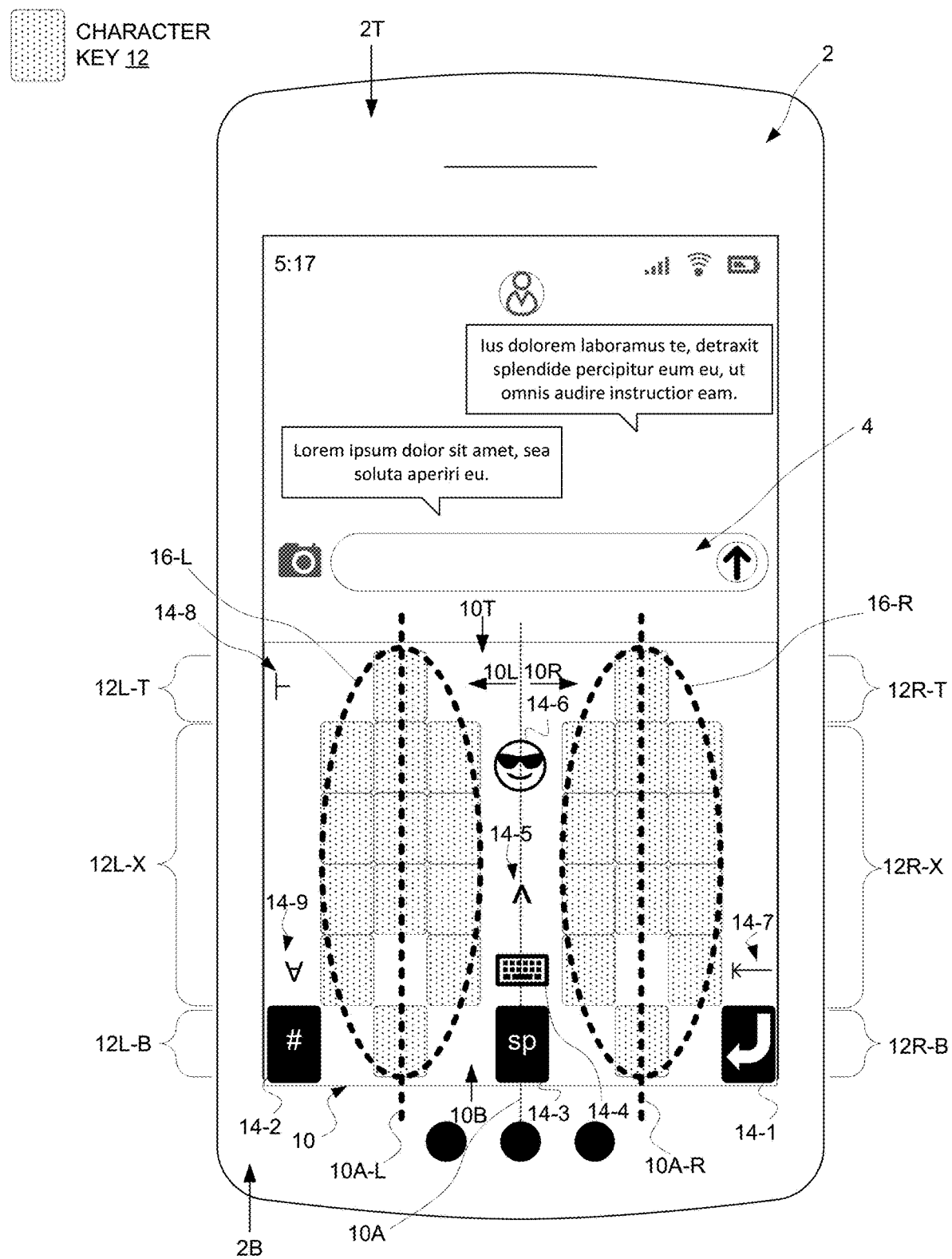
FIG. 1 is a block diagram of a keyboard according to some embodiments.

FIG. 1 shows a keyboard 10 according to some embodiments. The keyboard 10 may serve as part of a user interface for inputting characters of a writing system into a computing device 2. In some embodiments, such as the one illustrated in FIG. 1, the computing device may be a mobile device such as a smartphone. The keyboard 10 in this and other cases may be for inputting characters of the writing system into a text entry field 4 of the computing device 2. Such characters may represent letters of an alphabetic writing system, syllables of a syllabary writing system, and/or words, morphemes, or semantic units of a logographic writing system. Characters as used herein do not include any punctuation, accents, numbers, or other symbols that alone do not represent a letter, syllable, word, morpheme, or semantic unit of the writing system. In some embodiments, the characters input via the keyboard 10 are processed by the computing device 2 before and/or after displaying those characters or processed derivatives of those characters in the text entry field 4.

The keyboard 10 includes multiple character keys 12. A character key 12 as used herein is a key that is configured to input a character of the writing system into the computing device. Where the character that a character key is configured to input is a letter, the character key may be referred to as a letter key. Where the character that a character key is configured to input is a syllable or a logogram, the character key may be referred to as a syllable key or a logogram key, respectively. A character key 12 differs from any functional keys that may be included in the keyboard 10. Such functional keys may include, for example, a carriage return key 14-1, a number key 14-2 (#) for switching to a different keyboard for the input of numbers, a space key 14-3, a keyboard switch key 14-4 for switching to one or more other keyboards for other writing systems, a caps lock key 14-5 (^) for switching to a different keyboard for the input of capitalized or uncapitalized characters, an emoji key 14-6 for switching to a different keyboard for the input of emoji symbols, a backspace key 14-7 for deleting already input characters, a hide keyboard key 14-8 for hiding the keyboard 10, and a for-all keyboard key 14-9 configured for switching to a keyboard for logical symbols, punctuation, etc.

The keyboard 10 is functionally or logically split, relative to a central axis 10A, into a left-side keyboard section 10L on the left of the central axis 10A and a right-side keyboard section 10R on the right of the central axis 10A. The left-side keyboard section 10L includes multiple different rows of character keys 12, referred to as left-side rows. The left-side rows in this regard are formed from character keys 12 to the left of the central axis 10A. The left-side rows include a left-side top row 12L-T proximate to a top 10T of the keyboard 10 and a left-side bottom row 12L-B proximate to a bottom 10B of the keyboard. The top 10T of the keyboard 10 may be the side of the keyboard 10 closest to a top 2T of the computing device 2, whereas the bottom of the keyboard may be the side of the keyboard 10 closest to a bottom 2B of the computing device 2, e.g., at least for portrait orientation of the keyboard 10. Regardless, the left-side rows may also include one or more left-side intermediate rows 12L-X between the left-side top row 12L-T and the left-side bottom row 12L-B.

Similarly, the right-side keyboard section 10R includes multiple different rows of character keys 12, referred to as right-side rows. Right-side rows in this regard are formed from character keys 12 to the right of the central axis 10A. The right-side rows include a right-side top row 12R-T proximate to the top 10T of the keyboard and a right-side bottom row 12R-B proximate to the bottom 10B of the keyboard. The right-side rows may also include one or more right-side intermediate rows 12R-X between the right-side top row 12R-T and the right-side bottom row 12R-B. In fact, in some embodiments as shown, the left-side keyboard section 10L and the right-side keyboard section 10R are symmetrical in terms of the way the character keys in those sections 10L, 10R are arranged, e.g., with the same number of rows of character keys, with the same number of character keys in each respective row, and the like.

FIG. 1 further shows that, in one or more embodiments, the left-side top row 12L-T and the right-side top row 12R-T each have only a single character key. That is, the left-side top row 12L-T and the right-side top row 12R-T each has only one character key 12 in the row, with zero or more other types of keys (e.g., functional keys) possibly in the row as well. Alternatively or additionally, the left-side bottom row 12L-B and the right-side bottom row 12R-B each have only a single character key. In some embodiments, as shown in FIG. 1, the single character key in the left-side top row 12L-T and/or the single character key in the left-side bottom row 12L-B is centered on a left-side axis 10A-L extending between the left-side top row 12L-T and the left-side bottom row 12L-B. Alternatively or additionally, the single character key in the right-side top row 12R-T and/or the single character key in the right-side bottom row 12R-B is centered on a right-side axis 10A-R extending between the right-side top row 12R-T and the right-side bottom row 12R-B. Regardless, in some embodiments, such a single character key in a row may be referred to as an anchor point. In any event, inclusion of only a single character key in these top and/or bottom rows may effectively elongate the character key footprint in a vertical direction parallel to the central axis 10A so as to advantageously mimic thumbprints of thumbs with which the keyboard 10 is usable.

FIG. 1 further shows that, in some embodiments, the left-side keyboard section 10L has multiple left-side intermediate rows 12L-X. In one embodiment, for instance, there are three or more left-side intermediate rows 12L-X. In some embodiments, each of the left-side intermediate rows 12L-X has at least a left-side character key whose center is offset to the left of the left-side axis 10A-L and a right-side character key whose center is offset to the right of the left-side axis 10A-L. In one embodiment as shown, each of one or more of the left-side intermediate rows 12L-X also includes a center character key that is centered on the left-side axis 10A-L, e.g., in horizontal alignment with the single character key in the left-side top row 12L-T and/or the left-side bottom row 12L-B. FIG. 1 for example shows three topmost left-side intermediate rows that each have a center character key flanked on the left by a left-side character key and flanked on the right by a right-side character key, as well as one bottommost left-side intermediate row that has only a left-side character key and a right-side character key but no center character key. Of course, although FIG. 1 shows the left-side intermediate rows as having only two or three character keys, a left-side intermediate row in other embodiments may have more than three character keys, in which case there may be more than one left-side character key and/or more than one right-side character key in that row.

FIG. 1 similarly shows that, in some embodiments, the right-side keyboard section 10R has multiple right-side intermediate rows 12R-X. In one embodiment, for instance, there are three or more right-side intermediate rows 12R-X. In some embodiments, each of the right-side intermediate rows 12R-X has at least a left-side character key whose center is offset to the left of the right-side axis 10A-R and a right-side character key whose center is offset to the right of the right-side axis 10A-R. In one embodiment as shown, each of one or more of the right-side intermediate rows 12R-X also includes a center character key that is centered on the right-side axis 10A-R, e.g., in horizontal alignment with the single character key in the right-side top row 12R-T and/or the right-side bottom row 12R-B. FIG. 1 for example shows three topmost right-side intermediate rows that each have one center character key flanked on the left by one left-side character key and flanked on the right by one right-side character key, as well as one bottommost right-side intermediate row that has only one left-side character key and one right-side character key but no center character key. Of course, although FIG. 1 shows the right-side intermediate rows as having only two or three character keys, a right-side intermediate row in other embodiments may have more than three character keys, in which case there may be more than one left-side character key and/or more than one right-side character key in that row.

No matter the particular number of intermediate rows or the number of character keys in each intermediate row, the character keys 12 in some embodiments may form one or more clusters of character keys on the keyboard 10. As shown, for instance, the character keys 12 in the left-side rows form a left-side cluster 16-L and/or the character keys 12 in the right-side rows form a right-side cluster 16-R that is distinguishable from the left-side cluster 16-L. The left-side cluster 16-L and the right-side cluster 16-R may be non-overlapping with one another and/or be separated from one another by one or more non-character keys, e.g., functional keys 14-3, 14-4, 14-5, and/or 14-6 as shown. The character keys 12 in any given cluster 16-L or 16-R may be clustered in the sense that the character keys 12 are spatially grouped together in a contiguous manner, without any other types of keys interspersed therebetween. In some embodiment as shown in FIG. 1, though, character keys 12 in a cluster may still be considered clustered even if some of the character keys are separated by a non-key portion of the keyboard, e.g., the bottom intermediate row in FIG. 1 has a non-operable "blank" space rather than a center character key.

In some embodiments, a cluster of character keys 12 (e.g., cluster 16-L or 16-R) is bounded by a perimeter. In this case, some character keys 12 (e.g., those on the outermost parts of the cluster) may effectively form the perimeter of the cluster, whereas other character keys 12 may be in an inner part of the cluster so as to be surrounded by one or more other character keys in the cluster. As shown in FIG. 1, for example, the perimeter of the left-side cluster 16-L is formed by the single character key in the left-side top row 12L-T, the single character key in the left-side bottom row 12L-B, and the character keys on each end of the left-side intermediate rows 12L-X. Broadly, the character keys on each end of a left-side intermediate row 12L-X may include (i) the outermost left-side character key that is the character key offset the farthest left from the left-side axis 10A-L among all other character keys in that row; and (ii) the outermost right-side character key that is the character key offset the farthest right from the left-side axis 10A-L among all other character keys in that row. FIG. 1 generally depicts the perimeter of the left-side cluster 16-L as approximating the shape of an oval, e.g., with character keys forming the cluster's perimeter being disposed on the boundary of that shape.

Alternatively or additionally, FIG. 1 shows that the perimeter of the right-side cluster 16-R is formed by the single character key in the right-side top row 12R-T, the single character key in the right-side bottom row 12R-B, and the character keys on each end of the right-side intermediate rows 12R-X. Broadly, the character keys on each end of a right-side intermediate row 12R-X may include (i) the outermost left-side character key that is the character key offset the farthest left from the right-side axis 10A-R among all other character keys in that row; and (ii) the outermost right-side character key that is the character key offset the farthest right from the right-side axis 10A-R among all other character keys in that row. FIG. 1 generally depicts the perimeter of the right-side cluster 16-R as approximating the shape of an oval, e.g., with character keys forming the cluster's perimeter being disposed on the boundary of that shape.

Notably, in some embodiments, the character keys forming the perimeter of a cluster are arranged around the perimeter in a standardized order of the writing system. The standardized order may be standardized in the sense that it is recognized by a governing or standard-setting body as being the order in which characters of the writing system are ordered, e.g., for collation or learning purposes. Arranging the character keys in this way according to such a standardized order, e.g., so as to parallel a child's cognitive learning of that standardized order, may advantageously help expedite the process of learning how to type on the keyboard 10.

Figure 2A:
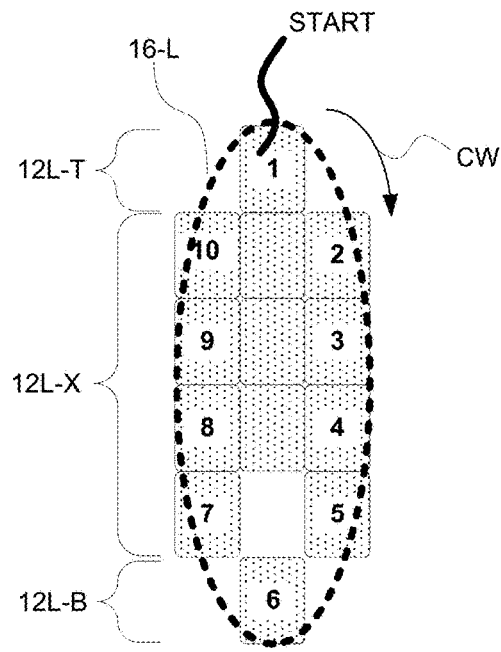
FIGS. 2A-2D are block diagrams of different character key arrangements in a cluster of character keys for a keyboard according to some embodiments.

FIG. 2A shows an example using the left-side cluster 16-L for illustration. As shown, the character keys 12 in the left-side cluster 16-L are configured and/or arranged such that the character keys forming the cluster's perimeter are keys for the first 10 characters in the writing system and are ordered in a clockwise (CVV) direction around the perimeter according to the standardized order of that writing system. In this example, then, the single character key in the left-side top row 12L-T (START) is the key for the $1^{st}$ character in the standardized order, the character key on the right end of the intermediate row immediately below the top-row 12L-T is the key for the $2^{nd}$ character in the standardized order, and so on.

Figure 2B:
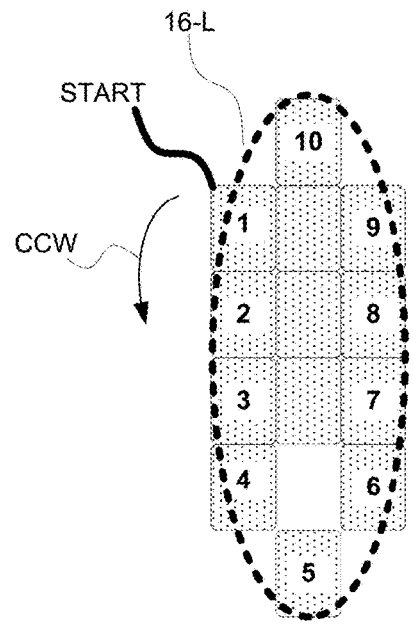

Although FIG. 2A illustrated the character keys being arranged around the perimeter in a clockwise direction according to the standardized order, starting with the topmost character key, other embodiments may be configured according to a different direction and/or starting position. FIG. 2B for instance shows the character keys 12 in the left-side cluster 16-L are configured and/or arranged such that the character keys forming the cluster's perimeter are keys for the first 10 characters in the writing system and are ordered in a counterclockwise (CCW) direction around the perimeter according to the standardized order of that writing system. In this example, the character key (START) on the left end of the intermediate row immediately below the top-row 12L-T is the key for the $1^{st}$ character in the standardized order, the character key immediately below that START key is the key for the $2^{nd}$ character in the standardized order, and so on.

Figure 2C:
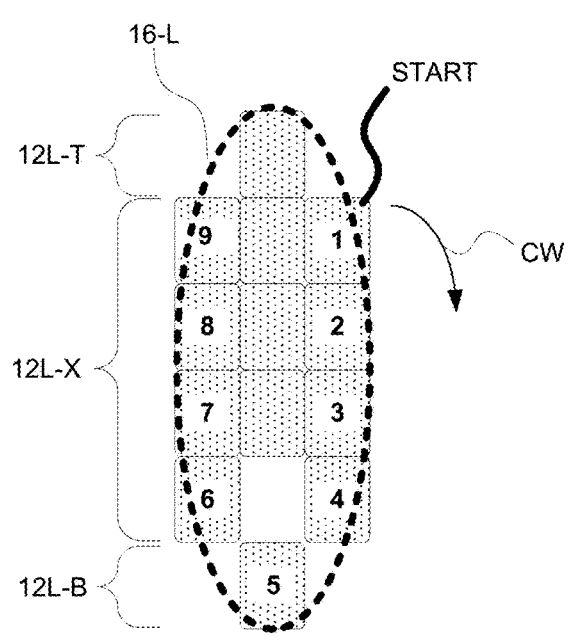

Furthermore, although FIGS. 2A and 2B illustrated that all keys around the cluster's perimeter are arranged around the perimeter in the standardized order, in other embodiments only a majority of character keys forming the perimeter are arranged around the perimeter in the standardized order. FIG. 2C illustrates an example. As shown, the character keys 12 in the left-side cluster 16-L are configured and/or arranged such that a majority of the character keys forming the cluster's perimeter are keys for the first 9 characters in the writing system and are ordered in a clockwise (CW) direction around the perimeter according to the standardized order of that writing system. In this example, the character key (START) on the right end of the intermediate row immediately below the top-row 12L-T is the key for the $1^{st}$ character in the standardized order, the character key immediately below that START key is the key for the $2^{nd}$ character in the standardized order, and so on. In this case, though, the single character key in the left-side top row 12L-T may not be arranged in the standardized order, despite the character key being on the cluster's perimeter.

Figure 2D:
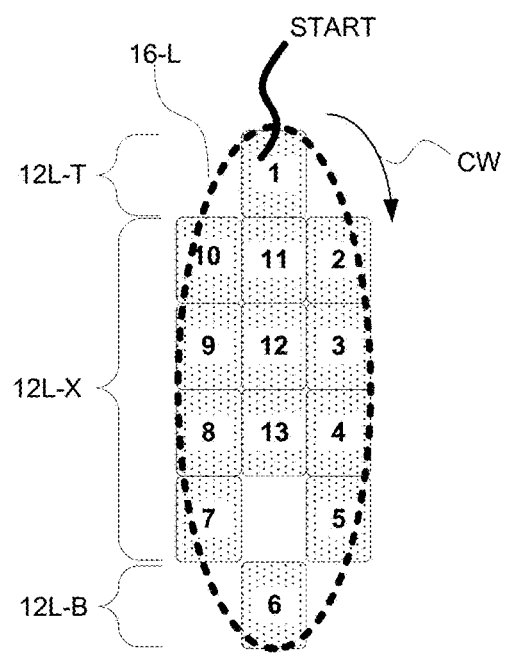

In some embodiments, character keys in an inner part of a cluster are also arranged (e.g., in a line) in the standardized order. These character keys may for instance continue the standardized order from where the order stopped with respect to the character keys on the perimeter, i.e., the character keys forming the perimeter are each ordered in the standardized order before any of the character keys in the cluster's inner part. FIG. 2D shows an example for continuing the standardized order as shown for the perimeter character keys in FIG. 2A. In this example, the character keys in the inner part of the left-side cluster 16-L are configured and/or arranged such that the character keys are ordered in a downward line according to the standardized order, starting from the $11^{th}$ character. In this example, then, the center character key in the intermediate row immediately below the top-row 12L-T is the key for the $11^{th}$ character in the standardized order, the character key immediately below that key is the key for the $12^{th}$ character in the standardized order, and the character key immediately below that key is the key for the $13^{th}$ character in the standardized order.

Figure 3:
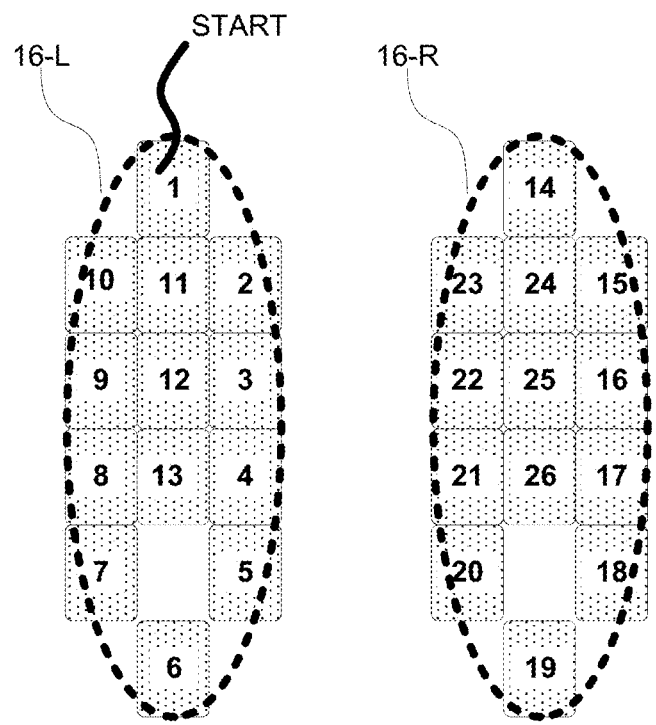
FIG. 3 is a block diagram of character keys in left-side and right-side clusters of character keys according to some embodiments.

Note that, although FIGS. 2A-2D were illustrated with respect to the start of the standardized order, the character keys forming the cluster's perimeter may be arranged in the standardized order starting from any point in that standardized order. In fact, this may especially be the case for at least one of the left-side cluster 16-L and the right-side cluster 16-R in embodiments where both cluster's character keys on the perimeter are arranged around the perimeter in the standardized order. FIG. 3 illustrates one example of this where the left-side cluster 16-L is configured with the first 13 characters of the standardized order as shown in FIG. 2D, and the right-side cluster 16-R is configured similarly but with respect to the next 13 characters of the standardized order.

Figure 4:
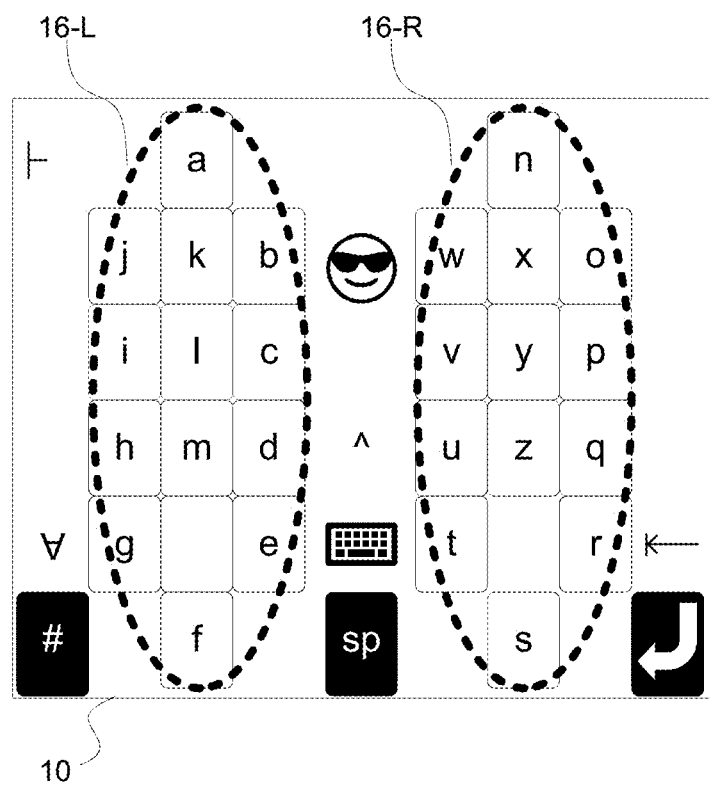
FIG. 4 is a block diagram of a keyboard for a Latin alphabet according to some embodiments.

FIG. 4 illustrates an example of the embodiment shown in FIG. 3, where the character keys 12 are letter keys that represent letters of an alphabetic writing system based on the Latin alphabet. In this case, the letter keys forming the perimeter of the left-side cluster 16-L are arranged around the perimeter in alphabetical order from a-to-j (the first 10 characters of the Latin alphabet), the letter keys in the inner portion of the left-side cluster 16-L are arranged in a downward line in alphabetical order from k-to-m (the next 3 characters of the Latin alphabet), the letter keys forming the perimeter of the right-side cluster 16-R are arranged around the perimeter in alphabetical order from n-to-w (the next 10 characters of the Latin alphabet), and the letter keys in the inner portion of the right-side cluster 16-R are arranged in a downward line in alphabetical order from x-to-z (the next 3 characters of the Latin alphabet). In other embodiments not shown, though, the character keys in the right-side cluster 16-R may be for the first 13 characters of the Latin alphabet whereas the character keys in the left-side cluster 16-L may be for the next 13 characters of the Latin alphabet.

For alphabetic writing systems that modify letters of the Latin alphabet (e.g., with diacritical marks), those modified letters may or may not be included in the standardized order according to which the character keys are arranged. In some embodiments, for example, letter keys may be considered as being in the standardized order as long as the non-modified letters of the alphabet are arranged in the standardized order only with respect to the non-modified letters themselves. Similarly, in writing systems that specify double letters, those double letters may or may not be included in the standardized order according to which the character keys are arranged. In some embodiments, for example, letter keys may be considered as being in the standardized order as long as the single letters of the alphabet are arranged in the standardized order only with respect to the single letters themselves, not the double letters.

Alternatively or additionally, some alphabetic writing systems have separate standardized orders for vowels and consonants. In this case, letter keys for vowels may be considered in standardized order if those letter keys are in the standardized order for vowels, and letter keys for consonants may be considered in standardized order if those letter keys are in the standardized order for consonants.

Figure 5A:
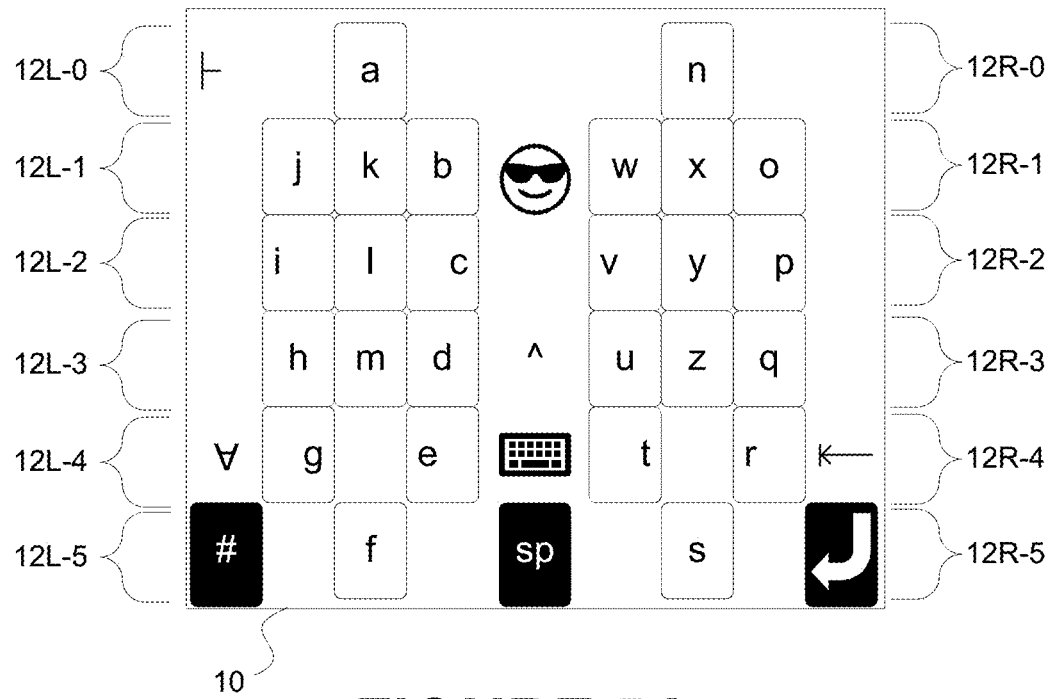
FIG. 5A is a block diagram of a keyboard with different inter-letter spacing in different rows of the keyboard according to some embodiments.

Also note that, although in some embodiments character keys are exactly aligned within columns and/or inter-character spacing within each row is the same, such may not be the case in other embodiments. FIG. 5A shows one example. In FIG. 5A, the left-side rows include row 12L-0 through row 12L-5. Row 12L-2 is the widest among the left-side rows in terms of inter-letter spacing. Specifically, the 'i' of the 'i' key is left-justified and the 'c' of the 'c' key is right-justified such that the space between the 'i' and the 'l' and the space between the 'l' and the 'c' is greater than the space between the characters in any other of the left-side rows. Rows 12L-1 and 12L-3 are each narrower than row 12L-2 in terms of inter-letter spacing. And row 12L-4 is even narrower than rows 12L-1 and 12L-3 in terms of inter-letter spacing. Specifically, the 'g' of the 'g' key is right-justified and the 'e' of the 'e' key is left-justified such that the space between the 'g' and the 'e' is narrower than the space between the characters in rows 12L-1 and 12L-3. The right-side rows similarly include row 12R-0 through row 12R-5, with row 12R-2 being the widest among the right-side rows in terms of inter-letter spacing, and row 12L-4 being the narrowest among the right-side rows in terms of inter-letter spacing.

Figure 5B:
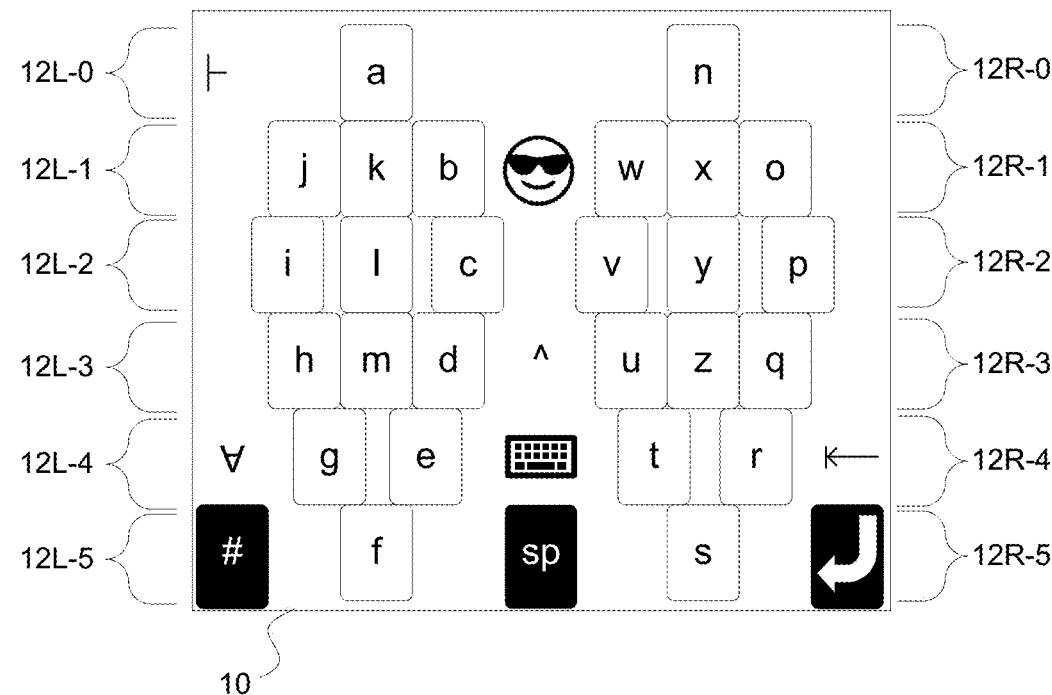
FIG. 5B is a block diagram of a keyboard with different inter-key distance in different rows of the keyboard according to some embodiments.

In other embodiments, different rows may differ in width in terms of the distance spanned by the character keys in the rows. FIG. 5B shows one example. In FIG. 5B, the left-side rows include row 12L-0 through row 12L-5. Row 12L-2 is the widest among the left-side rows in terms of the distance spanned by the character keys in the rows. Specifically, the horizontal distance spanned across the character keys in row 12L-2 is wider than the horizontal distance spanned across the character keys in any other row. Rows 12L-1 and 12L-3 are each narrower than row 12L-2 in terms of the distance spanned by the character keys. And row 12L-4 is even narrower than rows 12L-1 and 12L-3 in terms of such distance. The same may be said with respect to the right-side rows, with row 12R-2 being the widest among the right-side rows in terms of the distance spanned by the character keys, and row 12L-4 being the narrowest among the right-side rows in terms of the distance spanned by the character keys.

In some embodiments, differentiating the character keys of different rows in terms of inter-letter spacing or the distance spanned by the character keys may advantageously cause the characters of the character keys on a cluster's perimeter to be arranged in an approximately oval, diamond, or other basic shape. Approximating such a basic shape on the keyboard 10 that anyone can visually identify even at an early stage of mental cognitive development may help expedite learning how to type on the keyboard 10.

Figure 6:
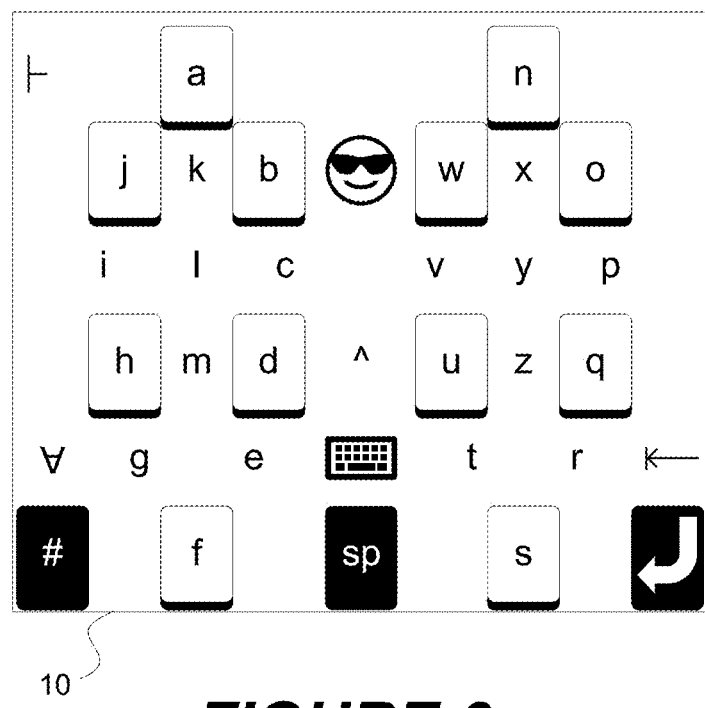
FIG. 6 is a block diagram of a keyboard with different visual characteristics for some keys according to some embodiments.
Figure 7B:
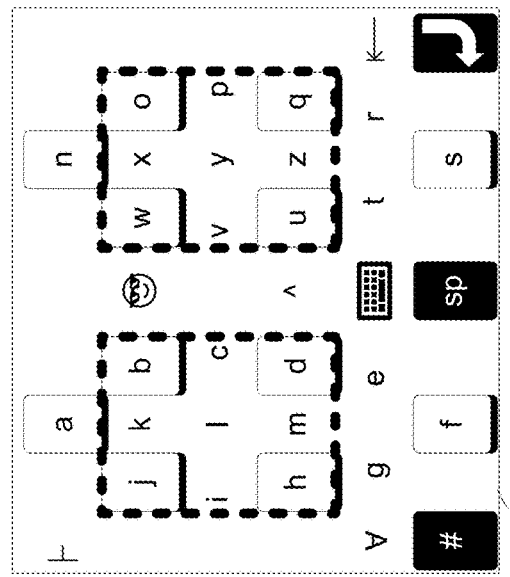
FIGS. 7A-7D are block diagrams of a keyboard with keys arranged to mirror basic shapes shown in respective figures according to some embodiments.
Figure 7D:
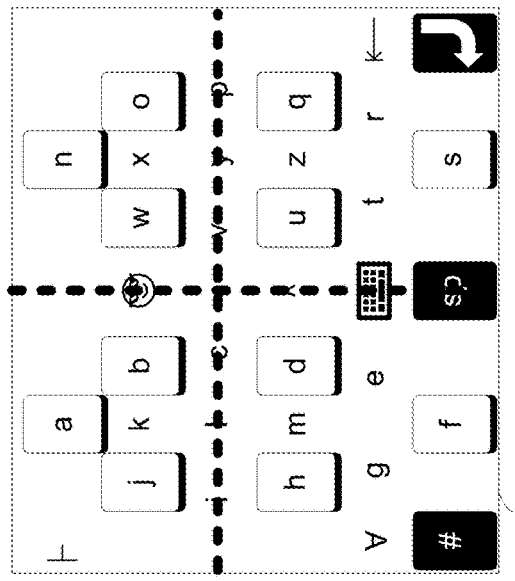
Figure 7A:
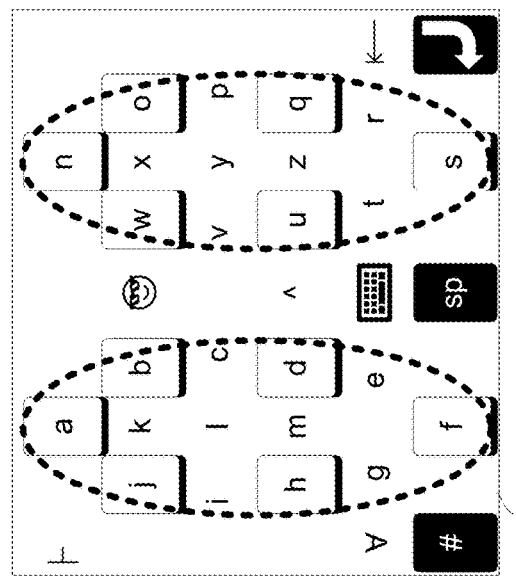
Figure 7C:
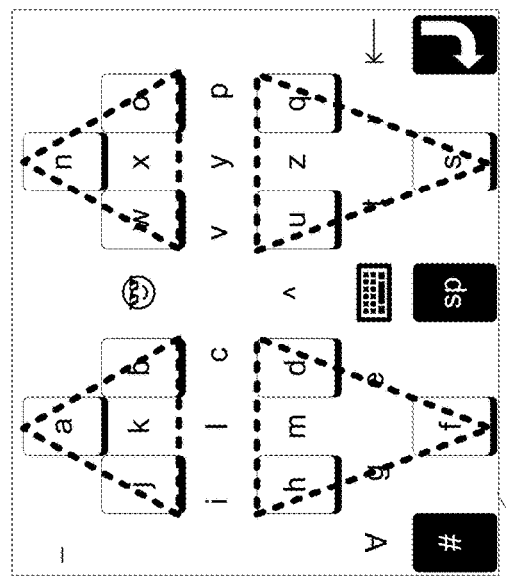

Note further that, although the character keys in embodiments above have been illustrated as having common similar characteristics except for the character displayed therein, at least some of the character keys in other embodiments are visually distinguishable from one another (in one or more ways other than the character displayed on them). In some embodiments, for instance, the single character keys in the left-side top row 12L-T, left-side bottom row 12L-B, right-side top row 12R-T, and right-side bottom row 12R-B have a common visual characteristic that visually distinguishes the single character keys from character keys in an inner part of the left-side cluster 16-L and from character keys in an inner part of the right-side cluster 16-R. Alternatively or additionally, some of the other character keys forming the perimeter of the left-side cluster 16-L and/or the right-side cluster 16-R may have the common visual characteristic. FIG. 6 illustrates one example where certain character keys on the perimeter of the left-side cluster and the right-side cluster have a common visual characteristic in the form of an outlined key boundary and a bottom-oriented drop shadow. This distinguishes those character keys from other keys of the keyboard which have no outlined key boundary and no drop shadow.

In some embodiments, visually distinguishing the character keys in this way may advantageously cause different groups of the character keys to be arranged in different respective basic shapes. As shown in FIGS. 7A-7D, these shapes may include an oval, a square, a triangle, and a line. Approximating such basic shapes on the keyboard 10 that anyone can visually identify even at an early stage of mental cognitive development may help expedite learning how to type on the keyboard 10.

In view of the above modifications and variations, various keyboards will now be illustrated for a variety of writing systems and associated languages. Like-numbered references described with respect to one Figure have the same functionality in other Figures.

FIGS. 8A-8B illustrate different embodiments of the keyboard 10 as applicable for an English language writing system. FIG. 8A substantially corresponds to the keyboard 10 shown in FIG. 6, with a-to-m character keys on the left and n-to-z character keys on the right. FIG. 8B shows a flipped version of the keyboard, with a-to-m character keys on the right and n-to-z character keys on the left. In some embodiments, the keyboards in FIGS. 8A and 8B each have a flip keyboard key 19 that switches the keyboard used by a computing device between the keyboards of FIGS. 8A and 8B. Both keyboards in FIGS. 8A and 8B may additionally include a punctuation (e.g., period) key 18. In some embodiments, the keyboards in FIGS. 8A and 8B each also include a language key 17 for switching between different language keyboards with which a computing device is configured, e.g., upon a long press of the key and subsequent selection of presented languages/flags. Alternatively or additionally, the keyboards in FIGS. 8A and 8B may each include a dividing line 15 (e.g., in faded gray color) that visually separates or distinguishes the left-side keyboard section from the right-side keyboard section.

Figure 9B:
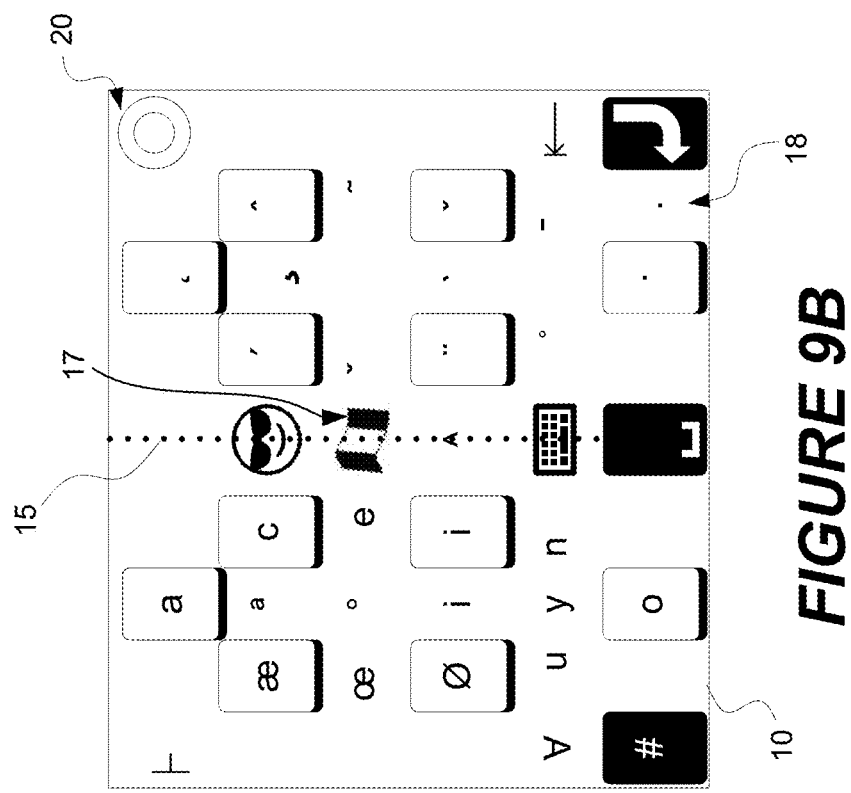
FIGS. 9A-9B are block diagrams of keyboards for a French language writing system according to some embodiments.
Figure 9A:
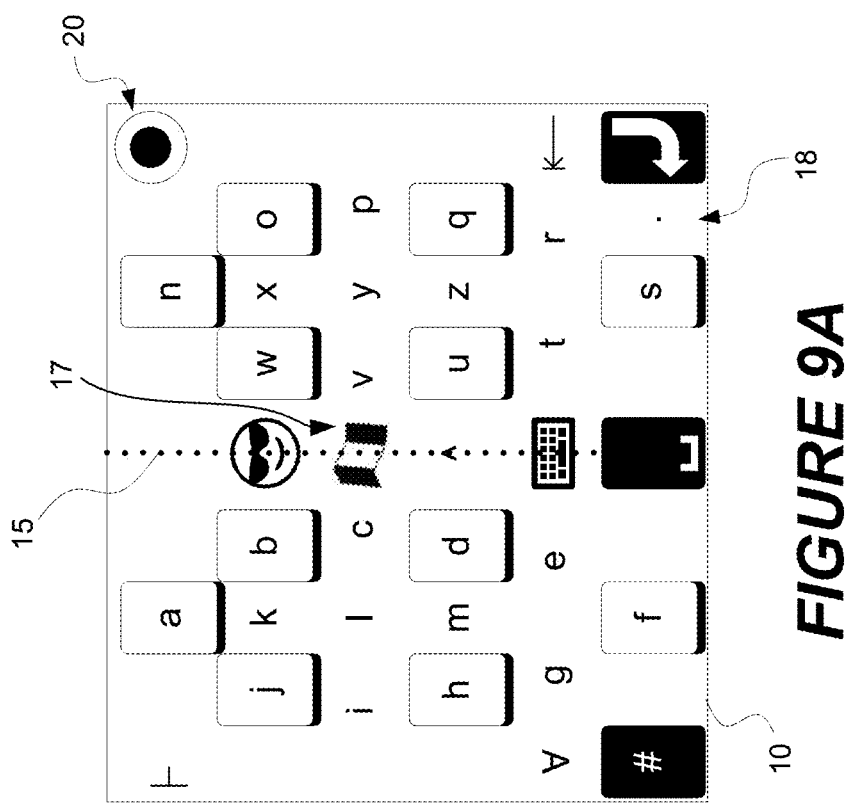

FIGS. 9A-9B illustrate different embodiments of the keyboard 10 as applicable for a French language writing system. FIG. 9A substantially corresponds to the keyboard 10 shown in FIG. 6, with a-to-m character keys on the left and n-to-z character keys on the right. The keyboard in FIG. 9A may also include a swap keyboard key 20 for switching the keyboard used by a computing device between the keyboards of FIGS. 9A and 9B. The keyboard in FIG. 9B may include other character keys, e.g., for modified characters, diacritical marks, etc.

Figure 10B:
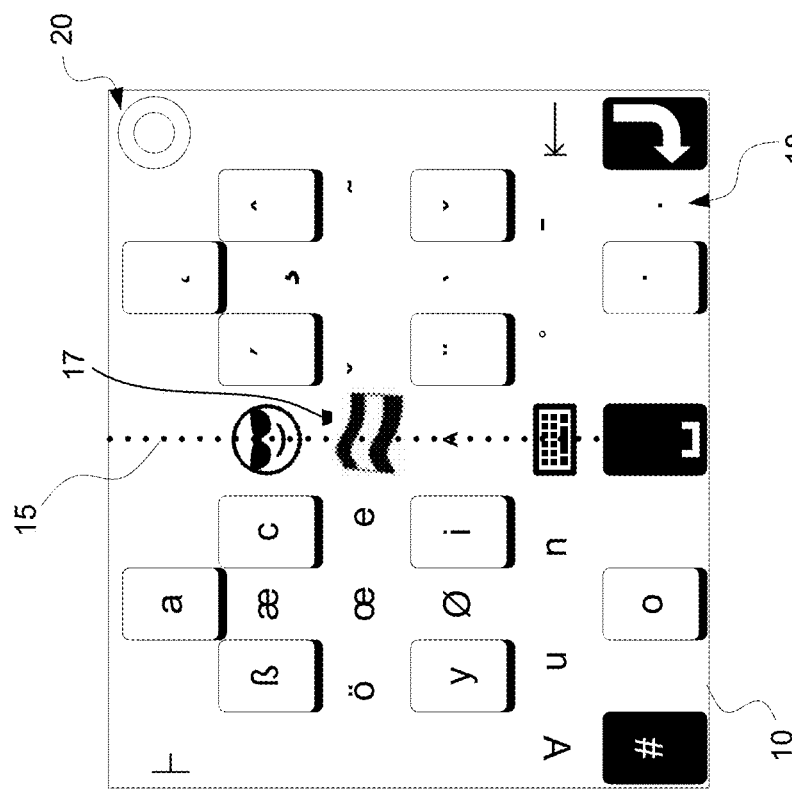
FIGS. 10A-10B are block diagrams of keyboards for a German language writing system according to some embodiments.
Figure 10A:
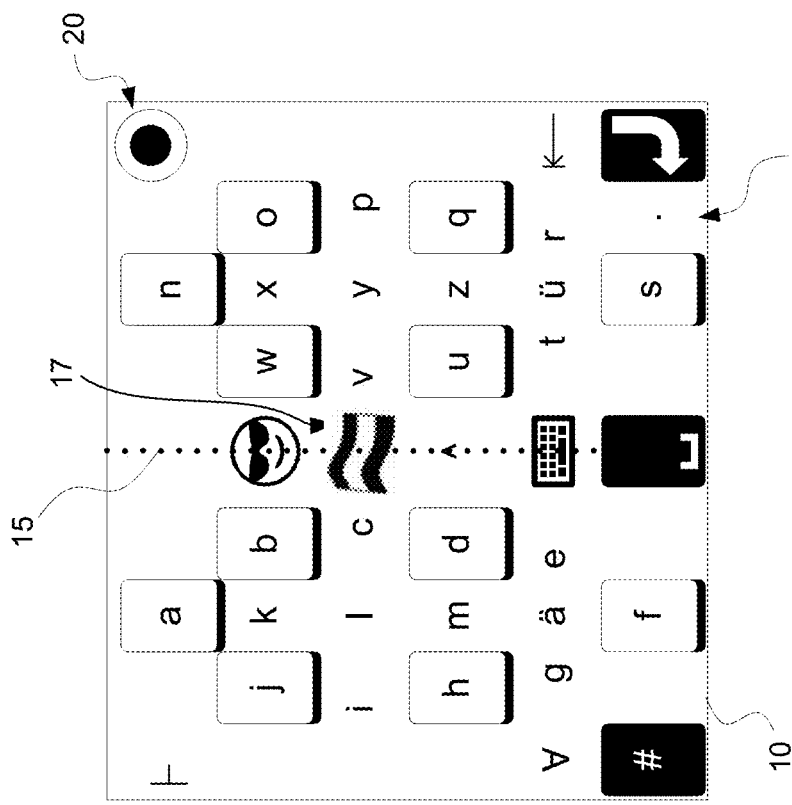

FIGS. 10A-10B illustrate different embodiments of the keyboard 10 as applicable for a German language writing system. FIG. 10A substantially corresponds to the keyboard 10 shown in FIG. 6, with a-to-m character keys as well as the a character key on the left, and n-to-z character keys as well as the ü character key on the right. The keyboard in FIG. 10B may include other character keys, e.g., for modified characters, diacritical marks, etc.

Figure 11B:
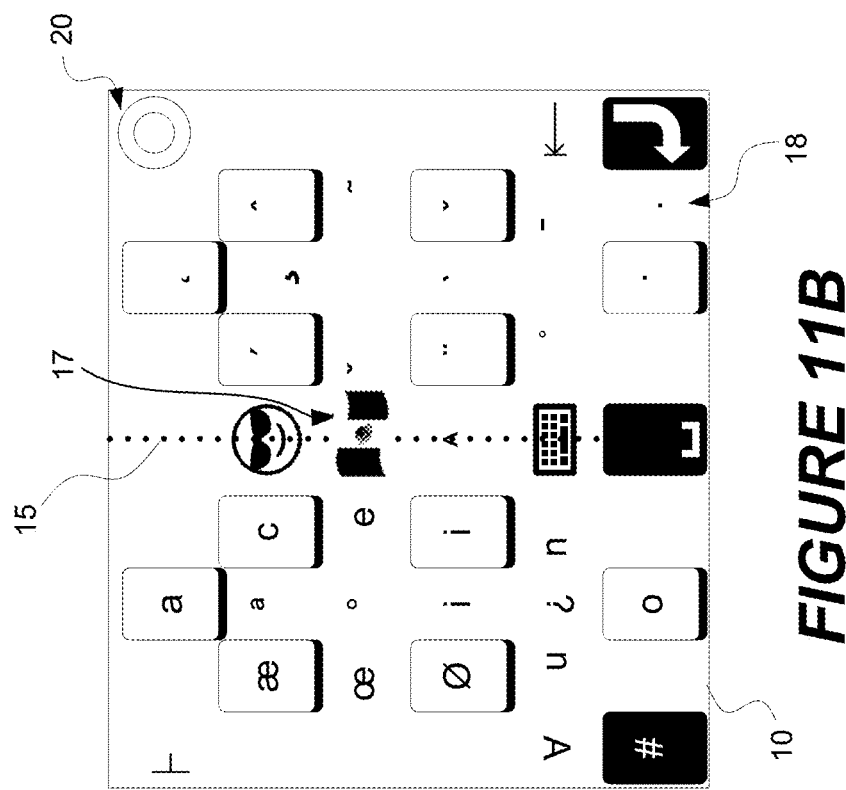
FIGS. 11A-11B are block diagrams of keyboards for a Spanish language writing system according to some embodiments.
Figure 11A:
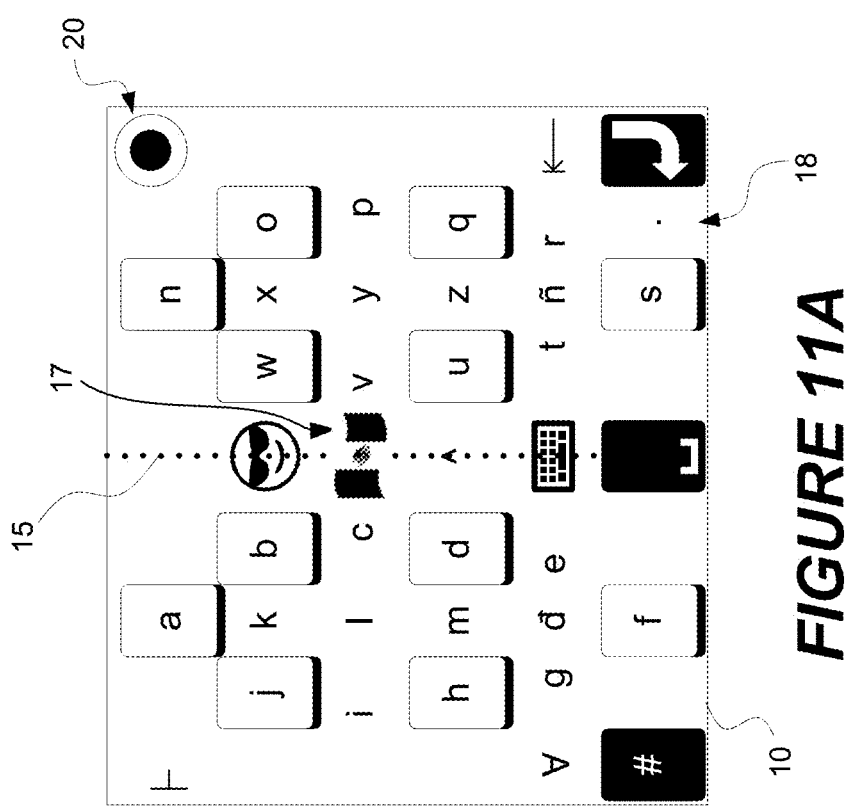

FIGS. 11A-11B illustrate different embodiments of the keyboard 10 as applicable for a Spanish language writing system. FIG. 11A substantially corresponds to the keyboard 10 shown in FIG. 6, with a-to-m character keys as well as the d character key on the left, and n-to-z character keys as well as the ñ character key on the right. The keyboard in FIG. 11B may include other character keys, e.g., for modified characters, diacritical marks, etc.

Figure 12B:
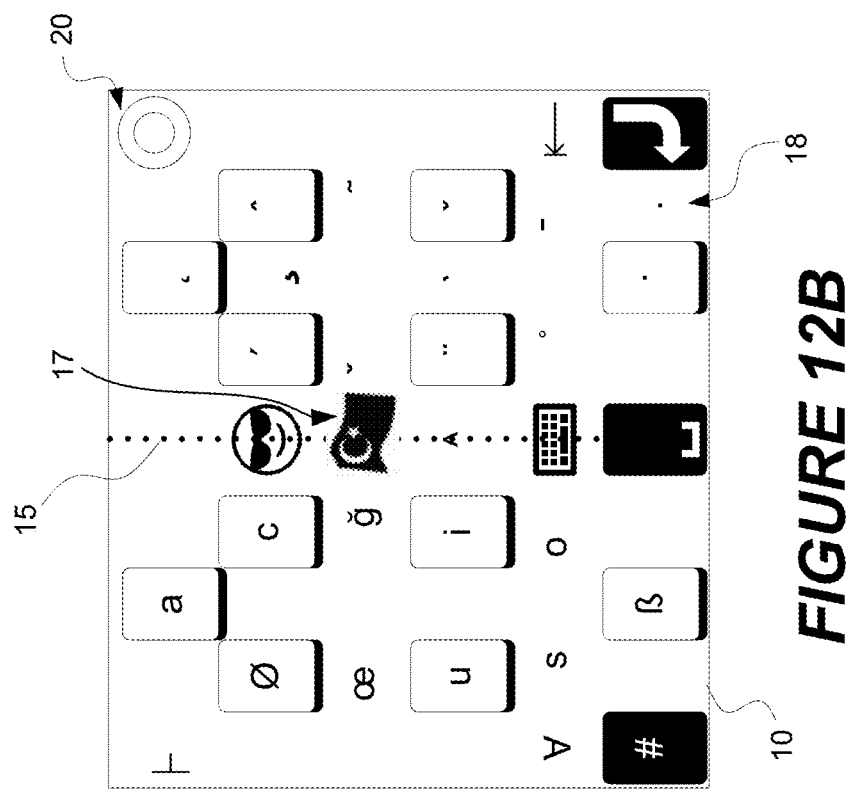
FIGS. 12A-12B are block diagrams of keyboards for a Turkish language writing system according to some embodiments.
Figure 12A:
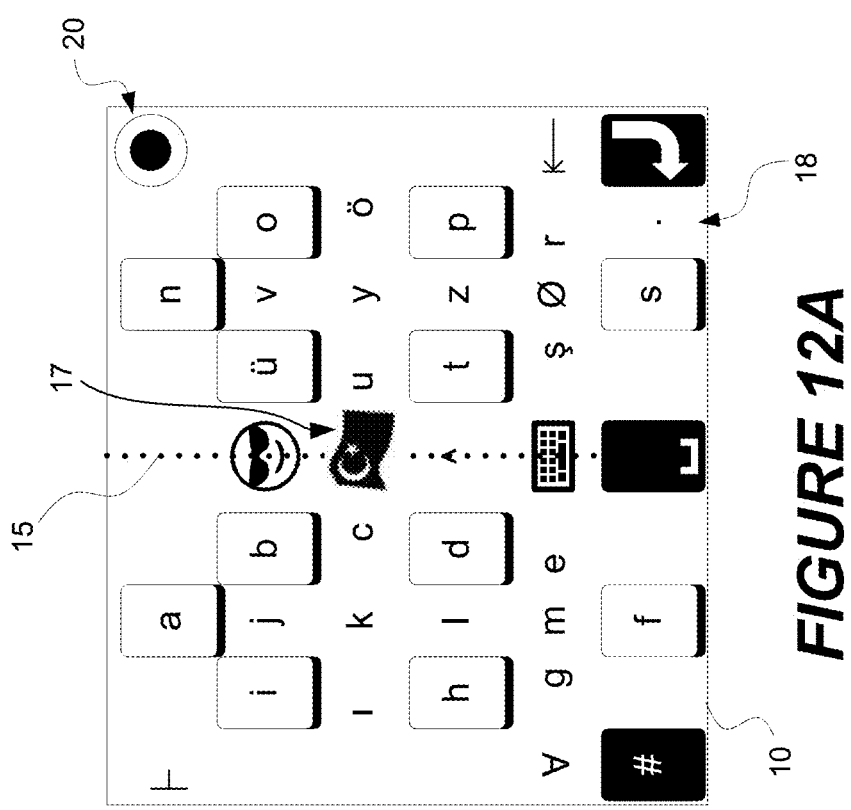

FIGS. 12A-12B illustrate different embodiments of the keyboard 10 as applicable for the Turkish language writing system. FIG. 12A includes a-to-m character keys on the left, and n-to-z character keys as well as the ø character key on the right. The keyboard in FIG. 12B may include other character keys, e.g., for modified characters, diacritical marks, etc.

Figure 13:
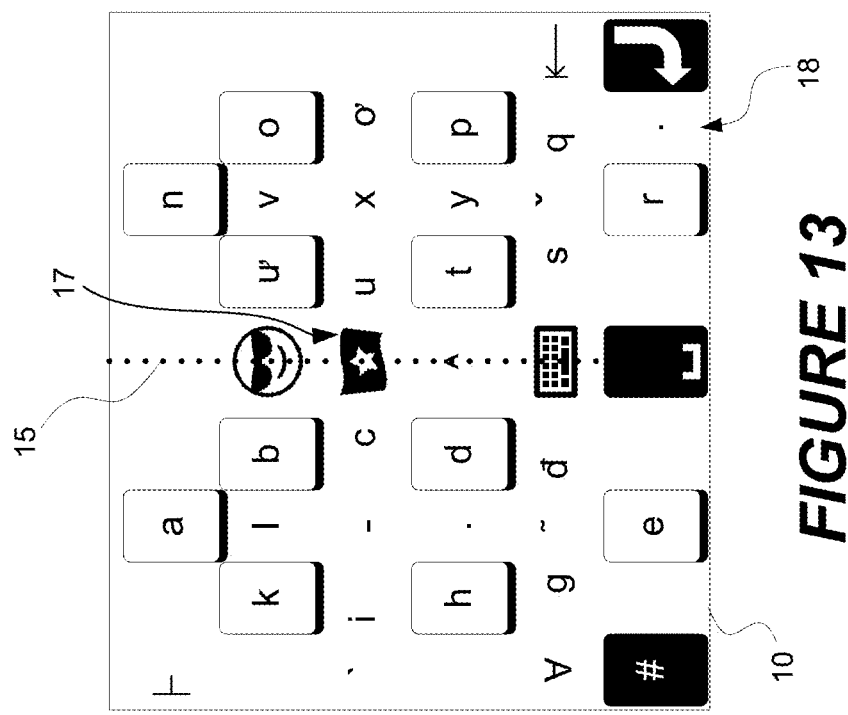
FIG. 13 is a block diagram of a keyboard for a Vietnamese language writing system according to some embodiments.

FIG. 13 illustrates one embodiment of the keyboard 10 as applicable for the Vietnamese language writing system. FIG. 13 includes the a-to-l character keys on the left, along with various accent mark keys, and includes the n-to-y character keys on the right, with an additional accent mark key.

Figure 14B:
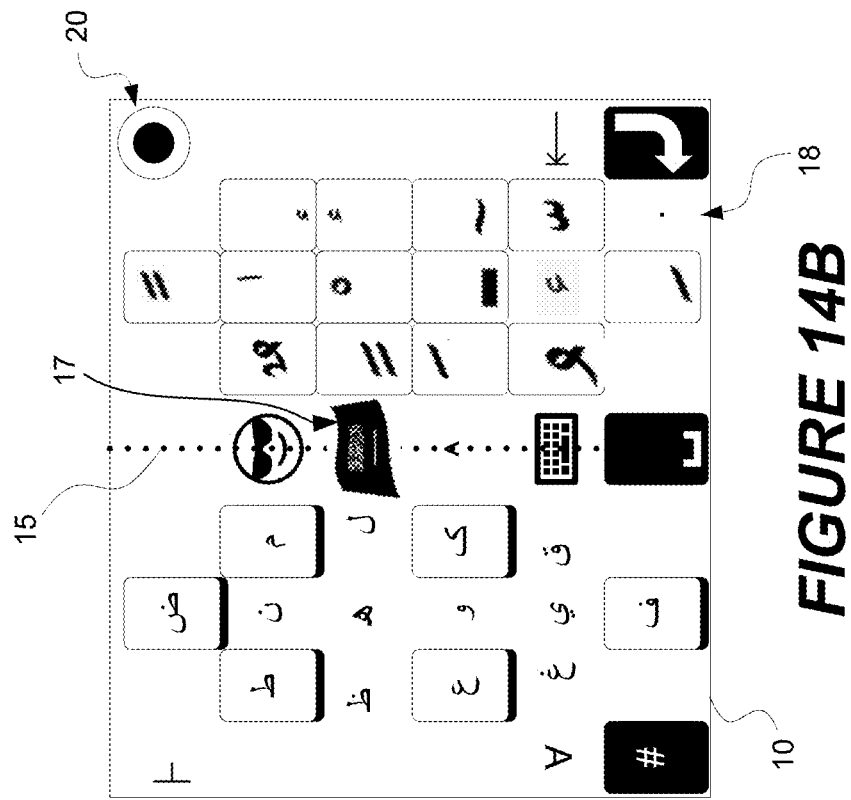
FIGS. 14A-14B are block diagrams of keyboards for a Modern Standard Arabic language writing system according to some embodiments.
Figure 14A:
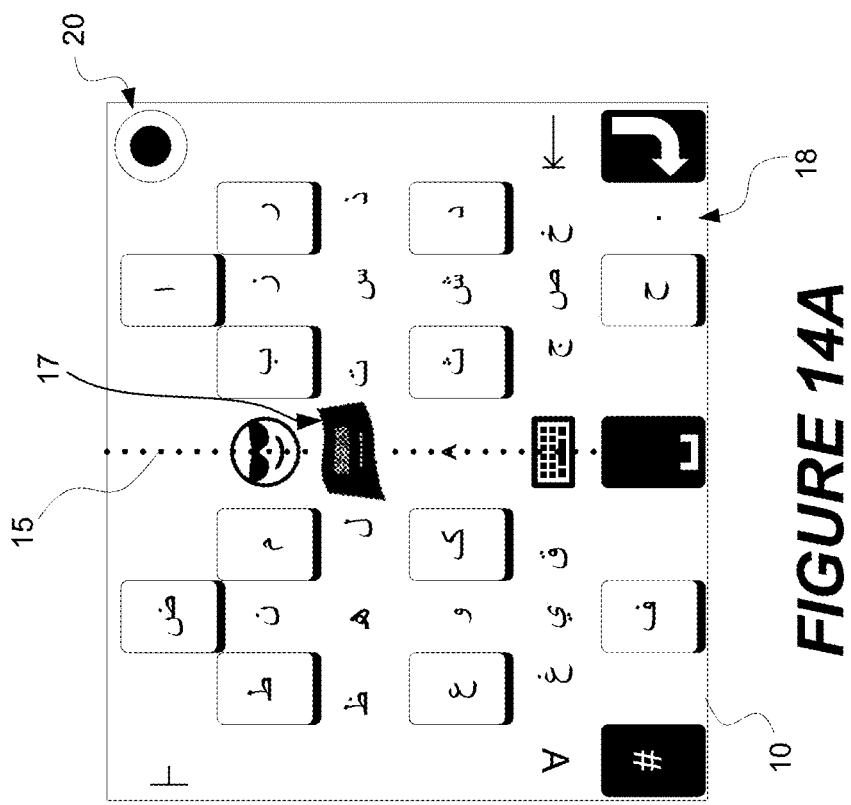

FIGS. 14A-14B illustrate different embodiments of the keyboard 10 as applicable for the Modern Standard Arabic language writing system. Modern Standard Arabic uses unicameral letters; that is, letters that have no definition between upper and lower cases, which is known as Haskh script.

Figure 15A:
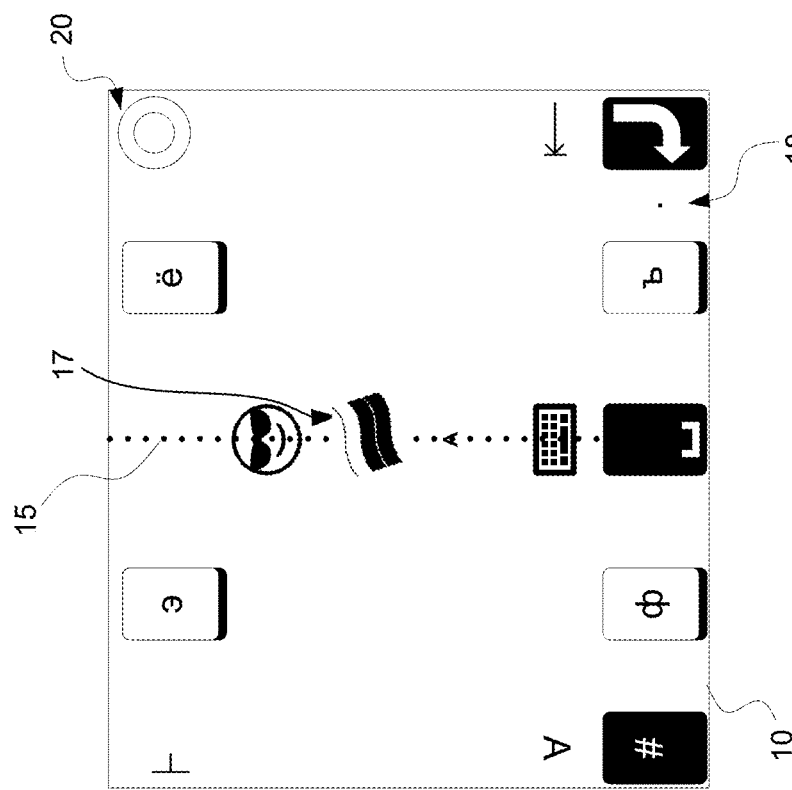
FIGS. 15A-15B are block diagrams of keyboards for a Russian language writing system according to some embodiments.
Figure 15B:
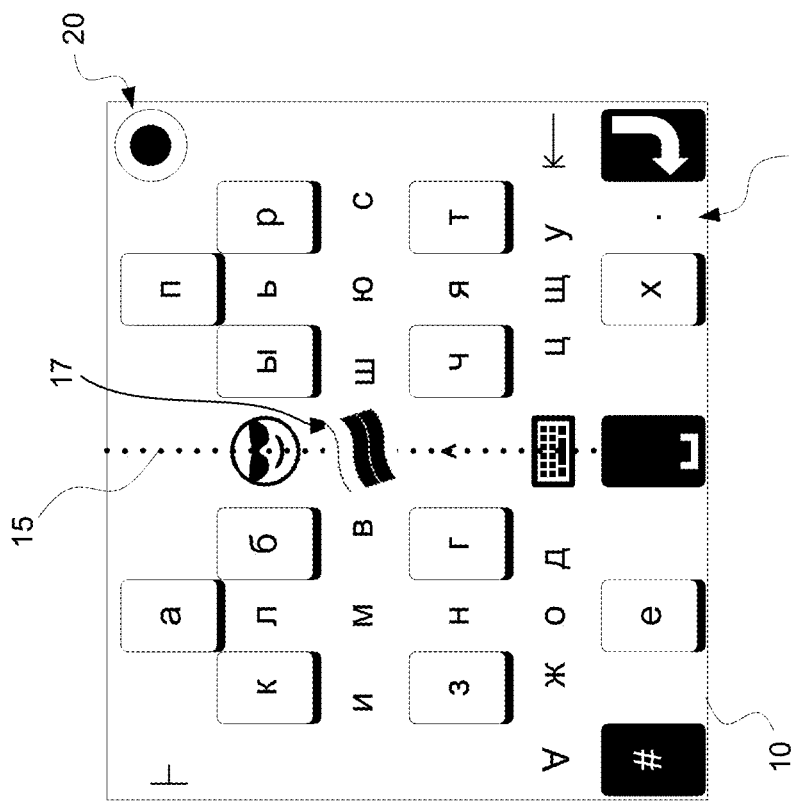

FIGS. 15A-15B illustrate different embodiments of the keyboard 10 as applicable for the Russian language writing system using a Cyrillic alphabet.

FIGS. 16A-16B illustrate different embodiments of the keyboard 10 as applicable for the Modern standard Hindi language writing system using the Devangari script.

Figure 17C:
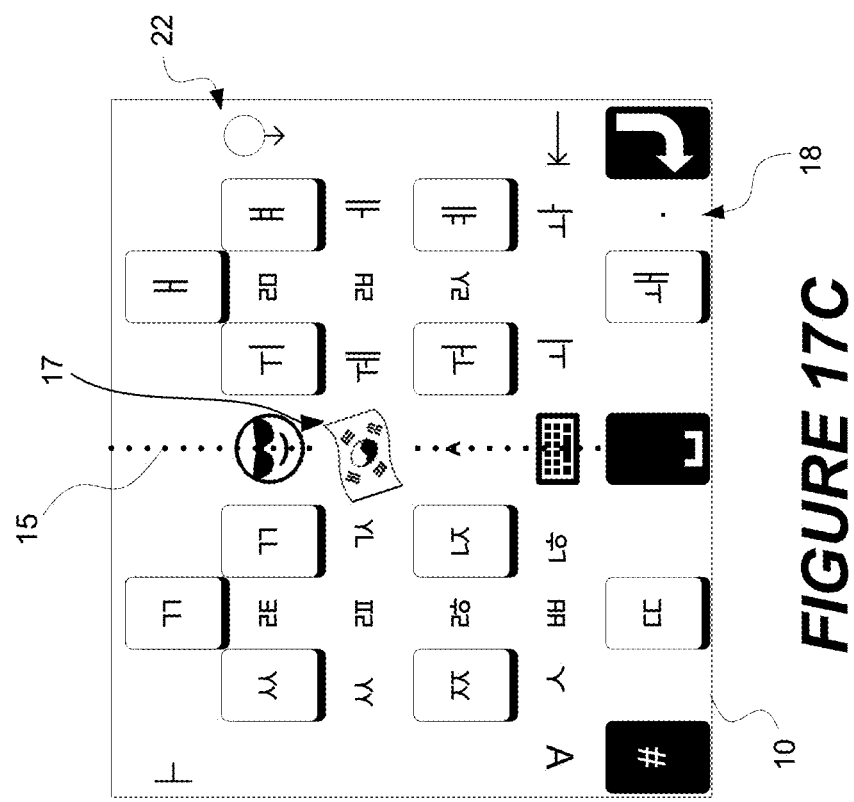

FIGS. 17A-17B illustrate different embodiments of the keyboard 10 as applicable for the Korean language writing system written in Hangul script. Characters input via the keyboard 10 may be grouped into syllabic or morphemic blocks of at least two or three characters, e.g., a consonant or doubled consonant called the initial, a vowel or diphthong called the medial, and, optionally, a consonant or consonant cluster at the end of the syllable, called the final. The keyboards in FIGS. 17A and 17B each are shown with a functional key 22 for switching between inputting characters as an initial (in FIG. 17A) or as a final (in FIG. 17B). Note that the standardized, alphabetical order according to which the character keys are ordered is without regard to double letters. In fact, according to some embodiments, the keyboard further includes a double letter key 24 for switching to a double letter keyboard shown in FIG. 17C.

Figure 18B:
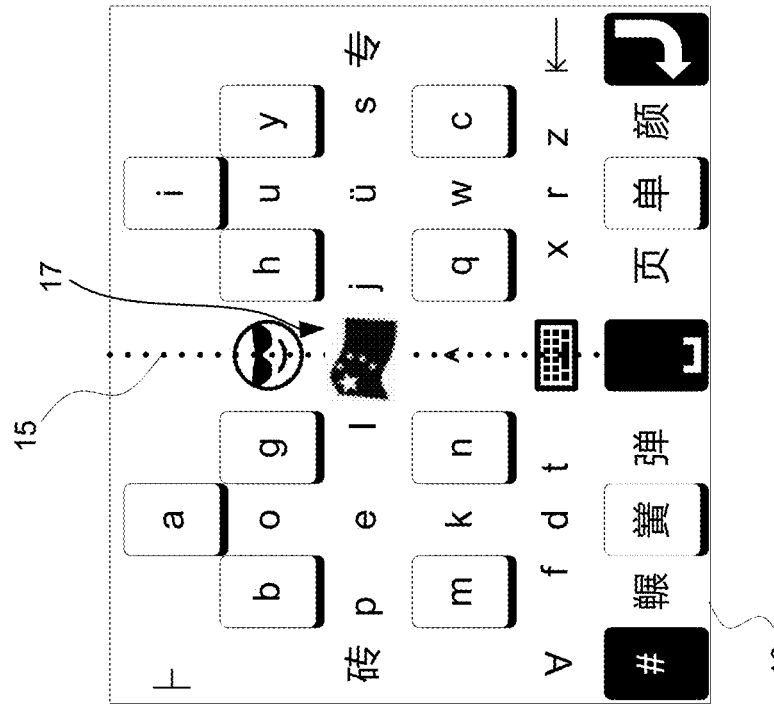
FIGS. 18A-18O are block diagrams of keyboards for a Hanyu Pinyin language writing system according to some embodiments.
Figure 18A:
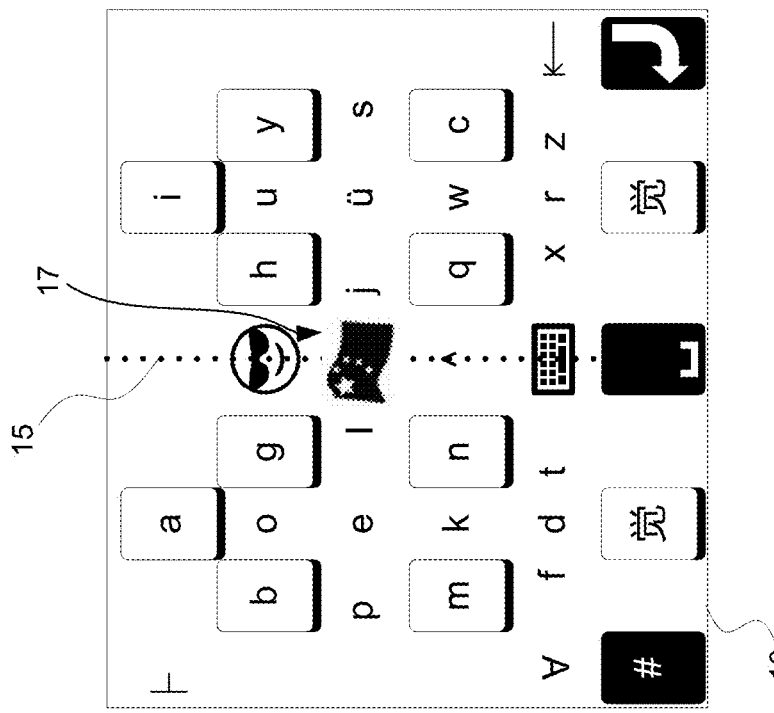

FIGS. 18A-18B illustrate different embodiments of the keyboard 10 as applicable for the Hanyu Pinyin writing system. Hanyu Pinyin is the official Romanizations system for Standard Chinese or Mandarin. The Romanization of Chinese is the use of the Latin alphabet to write Chinese, which uses logsyllabic characters called glyphs. FIG. 18A in this regard shows a keyboard with keys for letters of the Pinyin writing system. As letters are typed into the keyboard, Chinese characters applicable for the typed-in letters are populated around the character key clusters as shown in FIG. 18B, so as to expand the perimeter of the clusters.

Figure 18C:
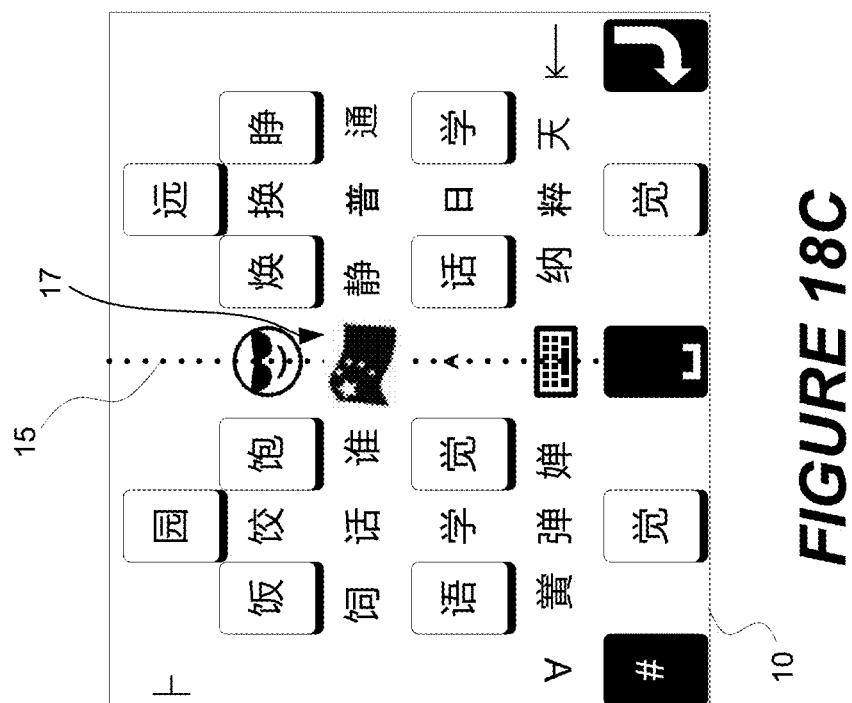

Either by way of the Pinyin keyboard in FIGS. 18A-18B, or independently therefrom, FIG. 18C shows an embodiment of the keyboard as applicable for Simplified Chinese. In some embodiments, for instance, different Chinese characters displayed in the keyboard of FIG. 18B are associated with different character sets. When one of the Chinese characters in the keyboard of FIG. 18B is long-pressed, the computing device 2 switches to the keyboard of FIG. 18C as populated with the character set associated with the Chinese character that was long-pressed.

Figure 19B:
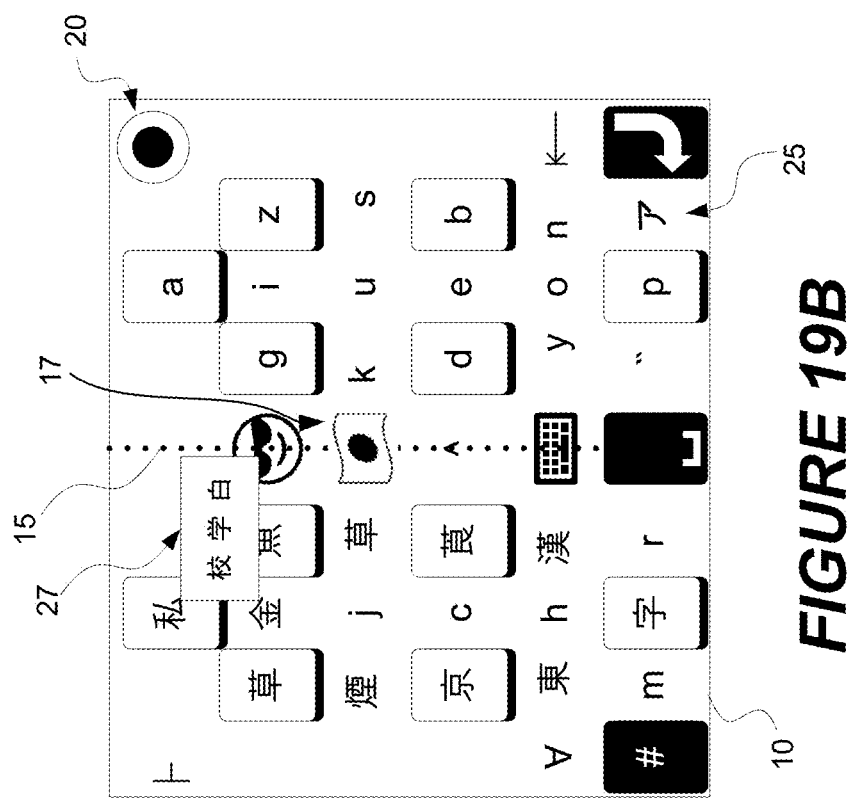
FIGS. 19A-19C are block diagrams of keyboards for a Romaji (Hepburn) writing system according to some embodiments.
Figure 19A:
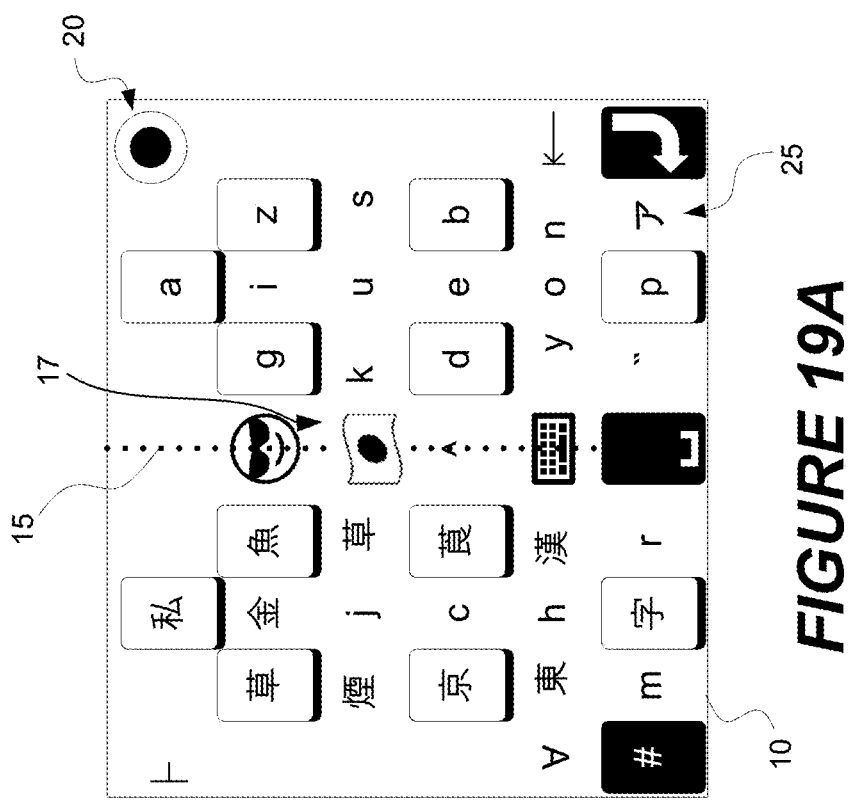
Figure 19C:
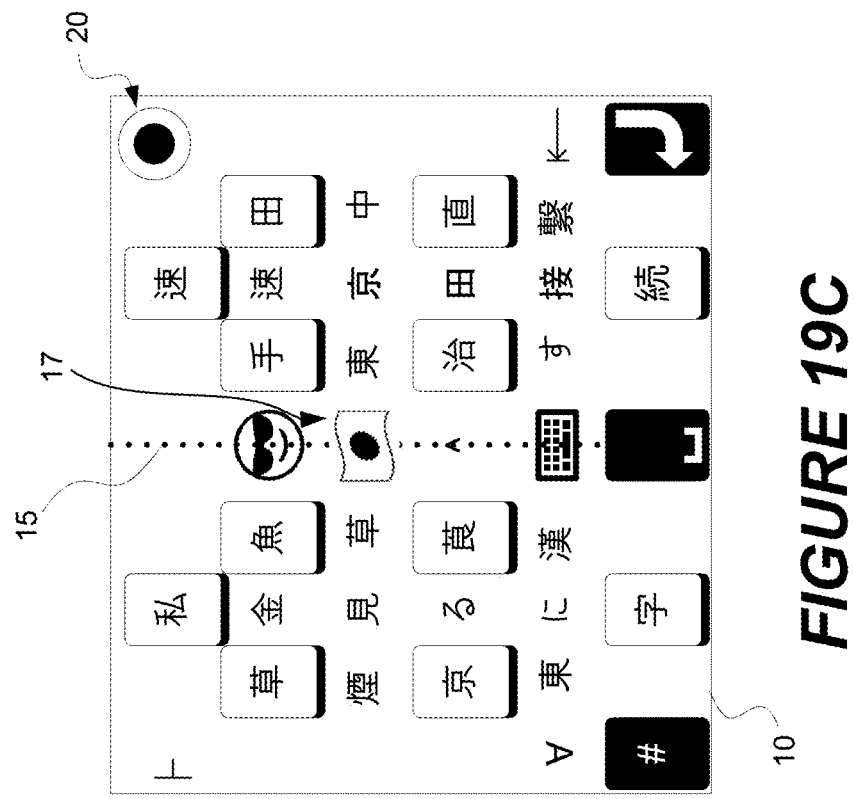

FIGS. 19A-19B illustrate different embodiments of the keyboard 10 as applicable for the Romaji (Hepburn) writing system. The Romaji system is a way of transliterating Japanese into the Latin alphabet. Letters input by the keyboard 10 are converted to kanji, hiragana, or katakana by the computing device. FIG. 19A in this regard shows Latin alphabet letters as well as Japanese characters representing different groups of characters. A long press on a Japanese character will display an overlap box 27 in FIG. 19B, for further selection. Different Japanese characters within the overlap box 27 are associated with different logical sets of Japanese characters. When on the Japanese characters in the overlap box 27 is pressed, the the computing device 2 switches to the keyboard of FIG. 19C as populated with the character set associated with the Japanese character that was pressed.

Figure 20A:
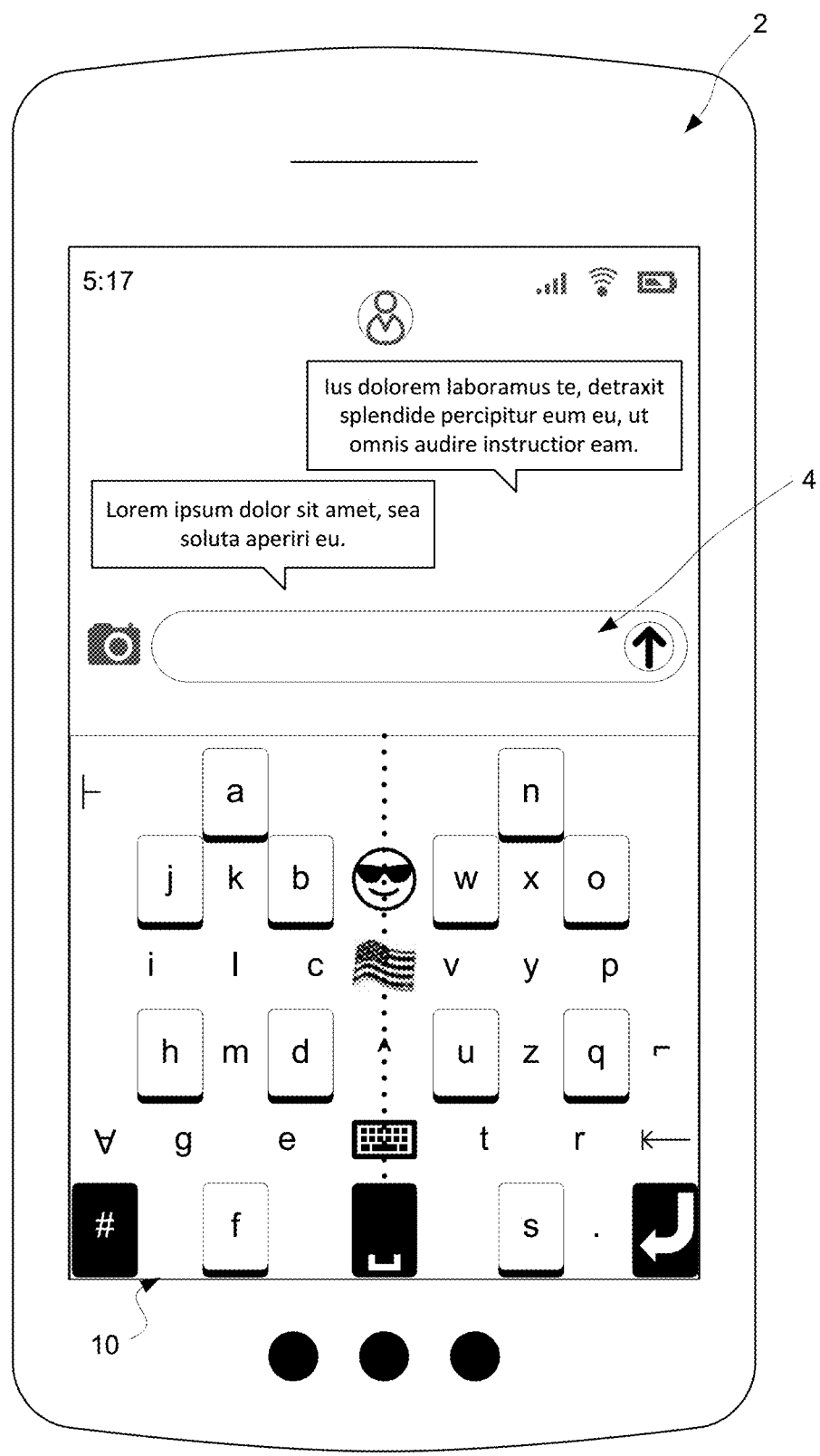
FIG. 20A is a block diagram of a keyboard for a computing device in portrait orientation according to some embodiments.
Figure 20B:
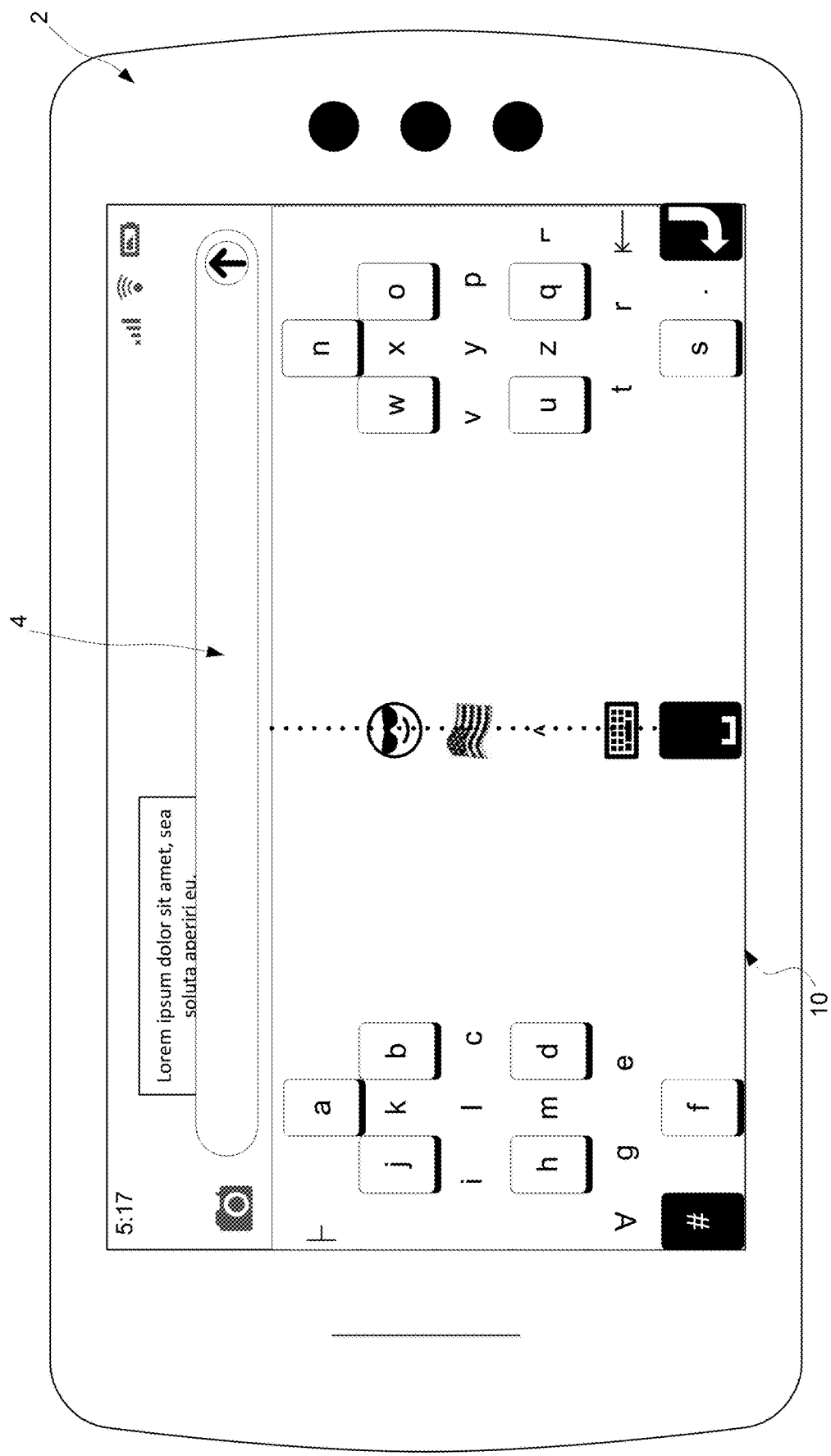
FIG. 20B is a block diagram of a keyboard for a computing device in landscape orientation according to some embodiments.
Figure 20C:
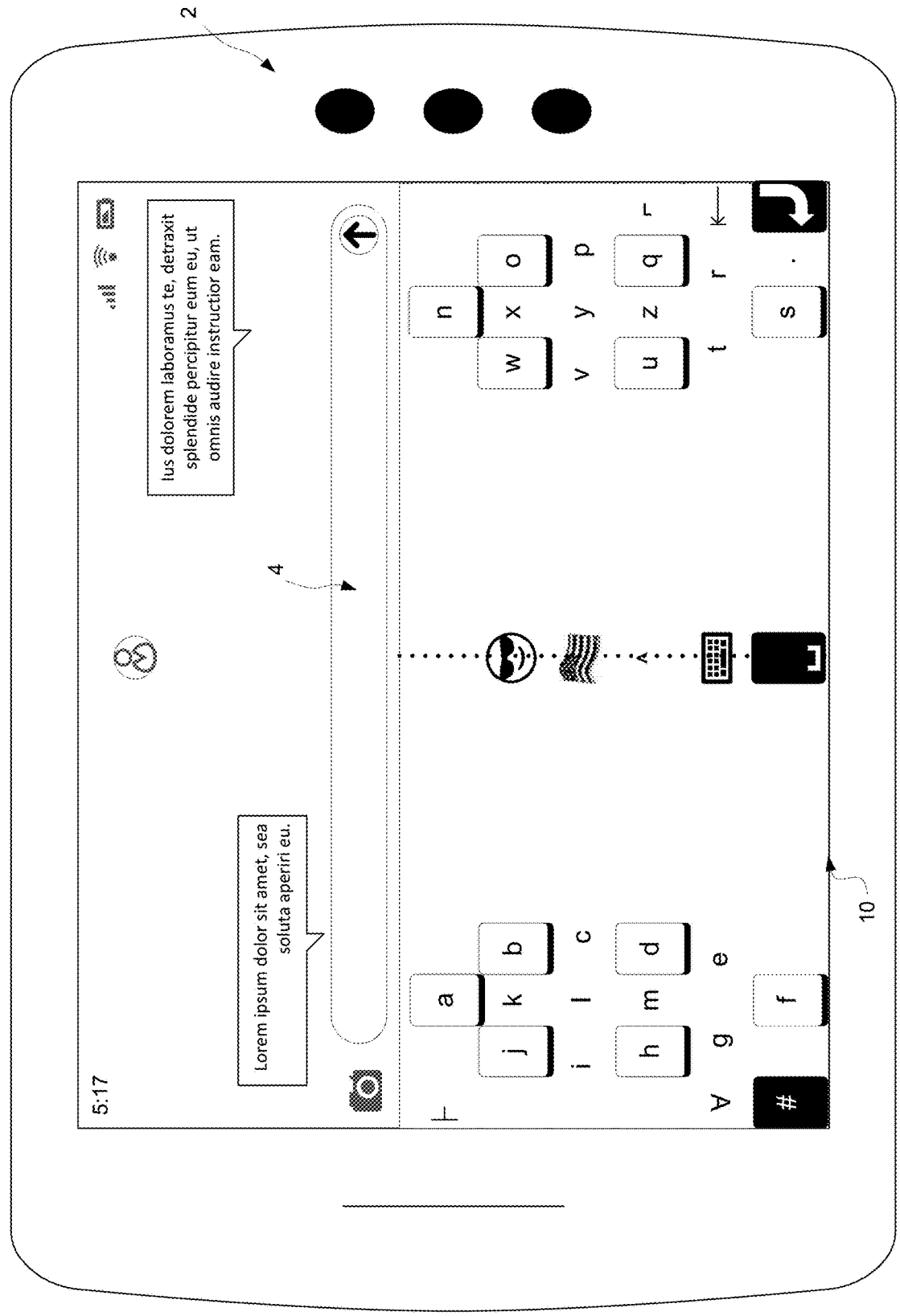
FIG. 20C is a block diagram of a keyboard for a tablet according to some embodiments.

FIG. 20A illustrates the keyboard 10 of FIG. 8A on an example computing device 2 in portrait orientation according to some embodiments. The left and right clusters of character keys are shown as proximate to where a user's thumbs would be used for two-thumbed typing. FIG. 20B by contrast illustrates the keyboard 10 of FIG. 8A on an example computing device 2 in landscape orientation according to some embodiments. The left and right clusters of character keys are separated further from one another and from the center axis of the keyboard 10 so as to be proximate to where a user's thumbs would be used for two-thumbed typing in landscape orientation. FIG. 20C illustrates the keyboard 10A may be similarly configured in a way appropriate for two-thumbed typing on a larger computing device, such as a tablet.

FIGS. 21A-21D illustrates other configurations of a keyboard 10 herein according to other embodiments, with respect to a 9×6 two-dimensional rectangular coordinate grid including columns c0-c8 and rows r1-r6 for a total of 54 cells. FIG. 21A shows an alphabet keyboard according to the English language. FIG. 21B shows a numeric keyboard. FIG. 21C shows a symbol keyboard. FIG. 21D shows an emoji keyboard. These and other embodiments therefore indicate that the keyboard 10 may be expressed in a 9×6 two-dimensional rectangular coordinate location base system when identifying the English and other language alphabetic systems, numbers, punctuation, emoji and logical symbols, and other functionality built into the keyboard(s).

Generally, then, a keyboard according to some embodiments herein encompasses left-thumb, right-thumb symmetry, alphabetical layout of the keys within the basic four geometric shapes (e.g., oval, square, triangle, and line) that are in parallel to the human cognitive process stemming from birth through early childhood development. These embodiments may exploit the fact that children have the cognitive mental development to sing and re-sight the alphabet and visually identify the four basic geometric shapes, along with the increasing numbers of the younger population using mobile devices. Indeed, today, many children are using mobile devices at an early age. A two year old child will learn to sing and re-sight their alphabet in a sequential order, but can't type those same letters in alphabetical order on a QWERTY designed keyboard without great difficulty. The inherent difficulty of typing on the QWERTY design is due at least in part to the non-symmetry and non-alphabetical order arrangement of the letters on the keyboard. Children will learn their alphabet several years before formal or non-formal learning to type on a QWERTY keyboard. A child's anatomical hand/finger spatial range to correctly position all ten fingers on a full-size QWERTY keyboard isn't possible until later in their physical development. Even before a child learns the alphabet, he or she will have the mental cognitive development to visually identify the four basic geometric shapes (oval, square, triangle, line), which QWERTY does not have in its design layout. Embodiments herein contrast with the QWERTY keyboard in these and other ways.

Note that the terms top, bottom, left, and right as used herein may be directions that mirror or are relative to a top, bottom, left, and right of the computing device 2.

In view of the above modifications and variations, a keyboard 10 according to some embodiments herein may take the form of a physical keyboard, e.g., with physical keys arranged as described above and configured to be physically depressed by a user for inputting characters into the computing device 2. In other embodiments, the keyboard 10 may take the form of a virtual keyboard, e.g., with virtual keys arranged as described above on a display and configured to be virtually depressed by a user for inputting characters into the computing device 2. The virtual keyboard in this case may for instance be provided on a touchscreen of the computing device 2, so that the virtual keys may be virtually depressed responsive to touch input of the user.

No matter whether the keyboard 10 is a physical keyboard or a virtual keyboard, the computing device 2 may be any type of device for which the keyboard 10 serves as at least part of a user interface for the device. The keyboard 10 may be integrally formed with the computing device 2, communicatively connected to the computing device 2 in a wired, wireless, or network communication manner, or (in the case of a virtual keyboard) executed by one or more processing circuits of the computing device 2.

In some embodiments, the computing device 2 is a wireless device, also referred to as a mobile device. As used herein, a wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. Examples of a WD include, but are not limited to, a smart phone, a mobile phone, a cell phone, a voice over IP (VoIP) phone, a wireless local loop phone, a desktop computer, a personal digital assistant (PDA), a wireless camera, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. Furthermore, a WD as described above may be mobile, in which case it may also be referred to as a mobile device or a mobile terminal.

Note that the keyboard 10 may be configured as described above using any functional means, modules, units, or circuitry. In one embodiment, for example, the keyboard 10 comprise respective circuits or circuitry configured to perform as described above. The circuits or circuitry in this regard may comprise circuits dedicated to performing certain functional processing and/or one or more microprocessors in conjunction with memory.

Similarly, especially when the keyboard 10 is provided by the computing device 2, the computing device 2 may provide the keyboard 10 (e.g., in virtual form) using any functional means, modules, units, or circuitry. In one embodiment, for example, the computing device 2 comprise respective circuits or circuitry configured to perform as described above. The circuits or circuitry in this regard may comprise circuits dedicated to performing certain functional processing and/or one or more microprocessors in conjunction with memory. For instance, the circuitry may include one or more microprocessor or microcontrollers, as well s other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, causes the computing device 2 to provide the keyboard 10 as described herein.

FIG. 22 for example illustrates a computing device 2 as implemented in accordance with one or more embodiments. As shown, computing device 2 includes processing circuitry 110. Processing circuitry 110 is configured to provide the keyboard 10 described above, such as by executing instructions stored in memory 130. Processing circuitry 110 in this regard may implement certain functional means, units, or modules. The computing device 2 may also include a user interface 100, e.g., in the form of a touchscreen display. The computing device 2 in some embodiments may also include communication circuitry 120. Communication circuitry 120 (e.g., radio circuitry) is configured to transmit and/or receive information to and/or from one or more other nodes, e.g., via any communication technology. Such communication may occur via one or more antennas that are either internal or external to computing device 2.

Figure 23:
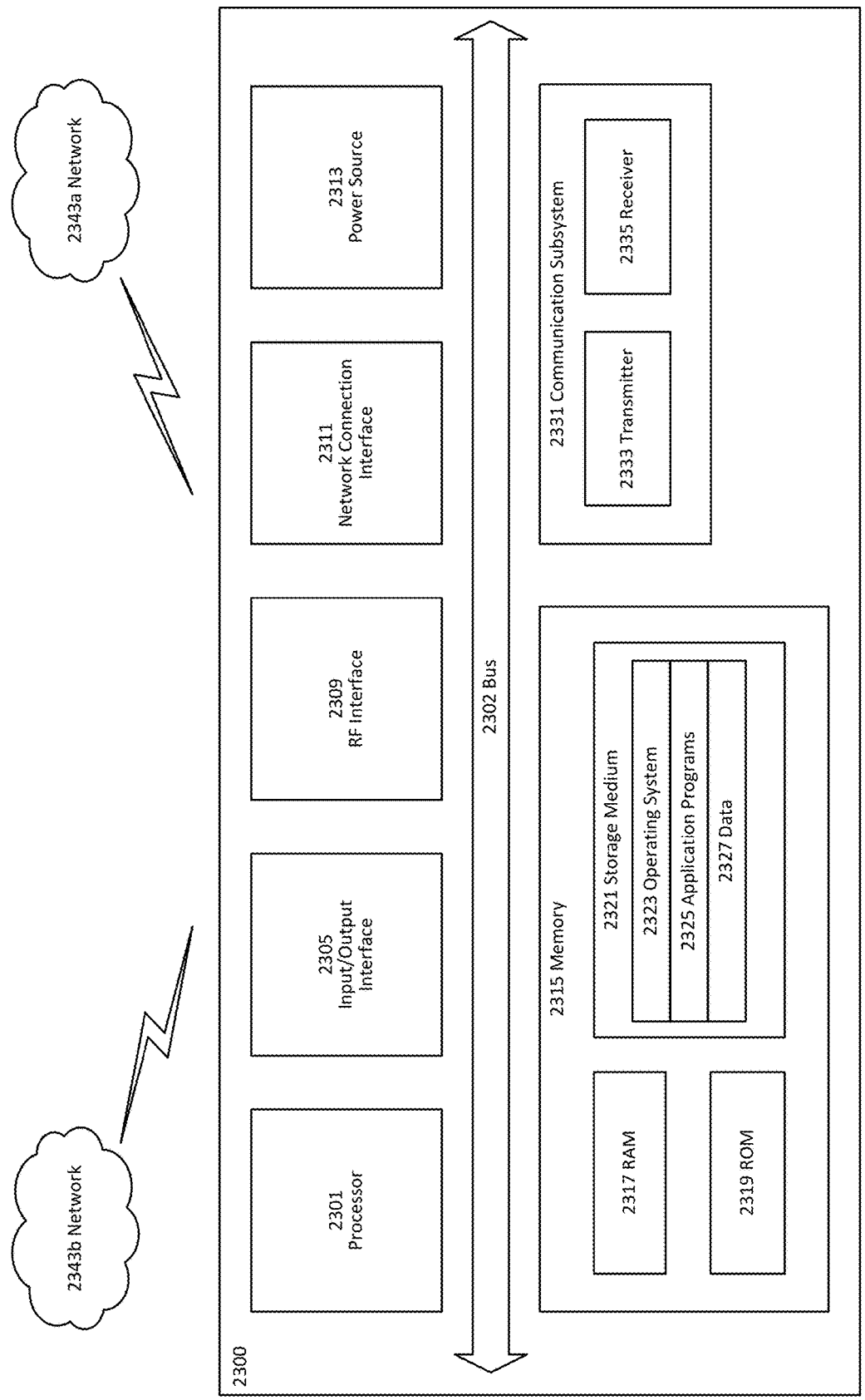
FIG. 23 is a block diagram of a computing device according to other embodiments.

FIG. 23 illustrates one embodiment of a computing device 2 in the form of a user equipment (UE) 2300 in accordance with various aspects described herein. UE 2300, as illustrated in FIG. 23, is one example of a wireless device configured for communication in accordance with one or more communication standards promulgated by the 3$^{rd}$ Generation Partnership Project (3GPP), such as 3GPP's GSM, UMTS, LTE, and/or 5G standards.

In FIG. 23, UE 2300 includes processing circuitry 2301 that is operatively coupled to input/output interface 2305, radio frequency (RF) interface 2309, network connection interface 2311, memory 2315 including random access memory (RAM) 2317, read-only memory (ROM) 2319, and storage medium 2321 or the like, communication subsystem 2331, power source 2333, and/or any other component, or any combination thereof. Storage medium 2321 includes operating system 2323, application program 2325, and data 2327. In other embodiments, storage medium 2321 may include other similar types of information. Certain UEs may utilize all of the components shown in FIG. 23, or only a subset of the components. The level of integration between the components may vary from one UE to another UE. Further, certain UEs may contain multiple instances of a component, such as multiple processors, memories, transceivers, transmitters, receivers, etc.

In FIG. 23, processing circuitry 2301 may be configured to process computer instructions and data. Processing circuitry 2301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2301 may include two central processing units (CPUs). Data may be information in a form suitable for use by a computer.

In the depicted embodiment, input/output interface 2305 may be configured to provide a communication interface to an input device, output device, or input and output device. UE 2300 may be configured to use an output device via input/output interface 2305. An output device may use the same type of interface port as an input device. For example, a USB port may be used to provide input to and output from UE 2300. The output device may be a speaker, a sound card, a video card, a display, a monitor, a printer, an actuator, an emitter, a smartcard, another output device, or any combination thereof. UE 2300 may be configured to use an input device via input/output interface 2305 to allow a user to capture information into UE 2300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. In some embodiments the input device includes the keyboard 10 herein. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 23, RF interface 2309 may be configured to provide a communication interface to RF components such as a transmitter, a receiver, and an antenna. Network connection interface 2311 may be configured to provide a communication interface to network 2343a. Network 2343a may encompass wired and/or wireless networks such as a local-area network (LAN), a wide-area network (WAN), a computer network, a wireless network, a telecommunications network, another like network or any combination thereof. For example, network 2343a may comprise a W-Fi network. Network connection interface 2311 may be configured to include a receiver and a transmitter interface used to communicate with one or more other devices over a communication network according to one or more communication protocols, such as Ethernet, TCP/IP, SONET, ATM, or the like. Network connection interface 2311 may implement receiver and transmitter functionality appropriate to the communication network links (e.g., optical, electrical, and the like). The transmitter and receiver functions may share circuit components, software or firmware, or alternatively may be implemented separately.

RAM 2317 may be configured to interface via bus 2302 to processing circuitry 2301 to provide storage or caching of data or computer instructions during the execution of software programs such as the operating system, application programs, and device drivers. ROM 2319 may be configured to provide computer instructions or data to processing circuitry 2301. For example, ROM 2319 may be configured to store invariant low-level system code or data for basic system functions such as basic input and output (I/O), startup, or reception of keystrokes from a keyboard that are stored in a non-volatile memory. Storage medium 2321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2321 may be configured to include operating system 2323, application program 2325 such as a web browser application, a widget or gadget engine or another application, and data file 2327. Storage medium 2321 may store, for use by UE 2300, any of a variety of various operating systems or combinations of operating systems.

Storage medium 2321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2321 may allow UE 2300 to access computer-executable instructions, application programs or the like, stored on transitory or non-transitory memory media, to off-load data, or to upload data. An article of manufacture, such as one utilizing a communication system may be tangibly embodied in storage medium 2321, which may comprise a device readable medium.

In FIG. 23, processing circuitry 2301 may be configured to communicate with network 2343b using communication subsystem 2331. Network 2343a and network 2343b may be the same network or networks or different network or networks. Communication subsystem 2331 may be configured to include one or more transceivers used to communicate with network 2343b. For example, communication subsystem 2331 may be configured to include one or more transceivers used to communicate with one or more remote transceivers of another device capable of wireless communication such as another WD, UE, or base station of a radio access network (RAN) according to one or more communication protocols, such as IEEE 802.23, CDMA, WCDMA, GSM, LTE, UTRAN, WMax, or the like. Each transceiver may include transmitter 2333 and/or receiver 2335 to implement transmitter or receiver functionality, respectively, appropriate to the RAN links (e.g., frequency allocations and the like). Further, transmitter 2333 and receiver 2335 of each transceiver may share circuit components, software or firmware, or alternatively may be implemented separately.

In the illustrated embodiment, the communication functions of communication subsystem 2331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2331 may include cellular communication, Wi-Fi communication, Bluetooth communication, and GPS communication. Network 2343b may encompass wired and/or wireless networks such as a local-area network (LAN), a wide-area network (WAN), a computer network, a wireless network, a telecommunications network, another like network or any combination thereof. For example, network 2343b may be a cellular network, a Wi-Fi network, and/or a near-field network. Power source 2313 may be configured to provide alternating current (AC) or direct current (DC) power to components of UE 2300.

Those skilled in the art will also appreciate that embodiments herein further include corresponding computer programs.

A computer program comprises instructions which, when executed on at least one processor of the computer device 2, cause the computer device 2 to provide a keyboard 10 for a user interface of the computing device 2 according to embodiments herein. A computer program in this regard may comprise one or more code modules corresponding to the means or units described above.

Embodiments further include a carrier containing such a computer program. This carrier may comprise one of an electronic signal, optical signal, radio signal, or a non-transitory computer-readable storage medium.

In this regard, embodiments herein also include a computer program product stored on a non-transitory computer readable (storage or recording) medium and comprising instructions that, when executed by a processor of computer device 2, cause the computer device 2 to perform as described above.

Embodiments further include a computer program product comprising program code portions for performing the steps of any of the embodiments herein when the computer program product is executed by a computer device 2. This computer program product may be stored on a computer readable recording medium.

What is claimed is:

1. A keyboard for inputting characters of a writing system into a computing device, the keyboard comprising:
   a central axis extending in a vertical direction;
   a left-side keyboard section on the left of the central axis comprising a left-side cluster of character keys formed from character keys in multiple different left-side rows, including a left-side top row proximate to a top of the keyboard and a left-side bottom row proximate to a bottom of the keyboard that each has only a single character key to elongate the left-side cluster of character keys in a vertical direction parallel to the central axis, wherein the character keys generally depict a perimeter of the left-side cluster as approximating an oval shape with character keys forming the perimeter of the left-side cluster being disposed on a boundary of the oval shape in alphabetical order of the writing system; and
   a right-side keyboard section on the right of the central axis comprising a right-side cluster of character keys formed from character keys in multiple different right-side rows, including a right-side top row proximate to the top of the keyboard and a right-side bottom row proximate to the bottom of the keyboard that each has only a single character key to elongate the right-side cluster of character keys in a vertical direction parallel to the central axis, wherein the character keys generally depict a perimeter of the right-side cluster as approximating an oval shape with character keys forming the perimeter of the right-side cluster being disposed on a boundary of the oval shape in alphabetical order of the writing system, wherein:
   the left-side keyboard section and the right-side keyboard section are spaced apart; and
   a flip key within the keyboard for switching the left-side cluster of character keys with the right-side cluster of character keys.

2. The keyboard of claim 1, wherein the left-side cluster includes left-side inner alphabetically-ordered character keys that are character keys in an inner part of the left-side cluster and that are arranged in a line in alphabetical order according to an alphabet, and wherein the right-side cluster includes right-side inner alphabetically-ordered character keys that are character keys in an inner part of the right-side cluster and that are arranged in a line in alphabetical order according to said alphabet.

3. The keyboard of claim 2, wherein either:
   the character keys forming the perimeter of the left-side cluster are each ordered in the alphabet before any of the left-side inner alphabetically-ordered character keys, the left-side inner alphabetically-ordered character keys are each ordered in the alphabet before any of the character keys forming the perimeter of the right-side cluster, and the character keys forming the perimeter of the right-side cluster are each ordered in the alphabet before any of the right-side inner alphabetically-ordered character keys; or
   the character keys forming the perimeter of the right-side cluster are each ordered in the alphabet before any of the right-side inner alphabetically-ordered character keys, the right-side inner alphabetically-ordered character keys are each ordered in the alphabet before any of the character keys forming the perimeter of the left-side cluster, and the character keys forming the perimeter of the left-side cluster are each ordered in the alphabet before any of the left-side inner alphabetically-ordered character keys.

4. The keyboard of claim 1:
   wherein the left-side rows further include:
     a widest left-side row that is between the left-side top row and the left-side bottom row, that has two or more character keys, and that is the widest among the left-side rows in terms of a distance spanned by character keys in the left-side row or in terms of inter-character spacing;
     an upper intermediate left-side row that is between the widest left-side row and the left-side top row, that has two or more character keys, and that is narrower than the widest left-side row in terms of a distance spanned by character keys in the left-side row or in terms of inter-character spacing; and
     a lower intermediate left-side row that is between the widest left-side row and the left-side bottom row, that has two or more character keys, and that is narrower than the widest left-side row in terms of a distance spanned by character keys in the left-side row or in terms of inter-character spacing; and
   wherein the right-side rows further include:
     a widest right-side row that is between the right-side top row and the right-side bottom row, that has two or more letter keys, and that is the widest among the right-side rows in terms of a distance spanned by character keys in the right-side row or in terms of inter-character spacing;
     an upper intermediate right-side row that is between the widest right-side row and the right-side top row, that has two or more character keys, and that is narrower than the widest right-side row in terms of a distance spanned by character keys in the right-side row or in terms of inter-character spacing; and a lower intermediate right-side row that is between the widest right-side row and the right-side bottom row, that has two or more character keys, and that is narrower than the widest right-side row in terms of a distance spanned by character keys in the right-side row or in terms of inter-character spacing.

5. The keyboard of claim 4, wherein the left-side rows further include a further lower intermediate left-side row that is between the lower intermediate left-side row and the left-side bottom row, that has two or more character keys, and that is narrower than the lower intermediate left-side row in terms of a distance spanned by character keys in the left-side row or in terms of inter-character spacing, and wherein the right-side rows further include a further lower intermediate right-side row that is between the lower intermediate right-side row and the right-side bottom row, that has two or more character keys, and that is narrower than the lower intermediate right-side row in terms of a distance spanned by character keys in the right-side row or in terms of inter-character spacing.

6. The keyboard of claim 1:

wherein the single character key in each of the left-side top row and the left-side bottom row is centered on a left-side axis extending between the left-side top row and the left-side bottom row, and wherein the single character key in each of the right-side top row and the right-side bottom row is centered on a right-side axis extending between the right-side top row and the right-side bottom row;

wherein each left-side intermediate row between the left-side top row and the left-side bottom row includes at least an outermost left-side character key and an outermost right-side character key, wherein the outermost left-side character key is offset the farthest left from the left-side axis among all character keys in the left-side intermediate row, and wherein the outermost right-side character key is offset the farthest right from the left-side axis among all character keys in the left-side intermediate row;

wherein the perimeter of the left-side cluster is formed from the single character key in the left-side top row, the single character key in the left-side bottom row, and the outermost left-side character key and the outermost right-side character key in each left-side intermediate row;

wherein each right-side intermediate row between the right-side top row and the right-side bottom row includes at least an outermost left-side character key and an outermost right-side character key, wherein the outermost left-side character key is offset the farthest left from the right-side axis among all character keys in the right-side intermediate row, and wherein the outermost right-side character key is offset the farthest right from the right-side axis among all character keys in the right-side intermediate row; and wherein the perimeter of the right-side cluster is formed from the single character key in the right-side top row, the single character key in the right-side bottom row, and the outermost left-side character key and the outermost right-side character key in each right-side intermediate row.

7. The keyboard of claim 1, wherein the left-side rows include the left-side top row, the left-side bottom row, and four left-side intermediate rows between the left-side top row and the left-side bottom row, wherein at least three of the four left-side intermediate rows includes three or more character keys, wherein the right-side rows include the right-side top row, the right-side bottom row, and four right-side intermediate rows between the right-side top row and the right-side bottom row, wherein at least three of the four right-side intermediate rows includes three or more character keys.

8. The keyboard of claim 1, wherein the single character keys in the left-side top row, the left-side bottom row, the right-side top row, and the right-side bottom row have a common visual characteristic that visually distinguishes the single character keys from character keys in an inner part of the left-side cluster and from character keys in an inner part of the right-side cluster, wherein at least some of the character keys forming the perimeter of the left-side cluster also have the common visual characteristic, and wherein at least some of the character keys forming the perimeter of the right-side cluster also have the common visual characteristic.

9. The keyboard of claim 1:

wherein the single character key in the left-side top row is an 'a' key;

wherein the left-side rows further include:

a second left-side row that is below the left-side top row and that, from left to right, includes a 'j' key, a 'k' key, and a 'b' key;

a third left-side row that is below the second left-side row and that, from left to right, includes an 'i' key, an 'l' key, and a 'c' key;

a fourth left-side row that is below the third left-side row and that, from left to right, includes an 'h' key, an 'm' key, and a 'd' key;

a fifth left-side row that is below the fourth left-side row, that is above the left-side bottom row, and that, from left to right, includes a 'g' key and an 'e' key;

wherein the single character key in the left-side bottom row is an 'f' key;

wherein the single character key in the right-side top row is an 'n' key;

wherein the right-side rows further include:

a second right-side row that is below the right-side top row and that, from left to right, includes a 'w' key, an 'x' key, and an 'o' key;

a third right-side row that is below the second right-side row and that, from left to right, includes a 'v' key, a 'y' key, and a 'p' key;

a fourth right-side row that is below the third right-side row and that, from left to right, includes a 'u' key, a 'z' key, and a 'q' key;

a fifth right-side row that is below the fourth right-side row, that is above the right-side bottom row, and that, from left to right, includes a 't' key and an 'r' key; and wherein the single character key in the right-side bottom row is an 's' key.

10. The keyboard of claim 1 further including a URL keyboard with a plurality of keys each providing quick-link access to web services.

11. A non-transitory computer-readable storage medium on which is stored program code that, when executed by one or more processors of a computing device, causes the computing device to provide a virtual keyboard for a user interface of the computing device, the stored program code comprising:

program code for providing a left-side keyboard section on the left of a central axis of the virtual keyboard, the central axis extending in a vertical direction, the left-side keyboard section comprising a left-side cluster of character keys formed from letter keys in multiple different left-side rows, including a left-side top row proximate to a top of the virtual keyboard and a left-side bottom row proximate to a bottom of the virtual keyboard that each has only a single character key to elongate the left-side cluster of character keys in a vertical direction parallel to the central axis, wherein the character keys generally depict a perimeter of the left- side cluster as approximating an oval shape with character keys forming the perimeter of the left-side cluster being disposed on a boundary of the oval shape in alphabetical order of a writing system; and program code for providing a right-side keyboard section on the right of the central axis comprising a right-side cluster of character keys formed from character keys in multiple different right-side rows, including a right-side top row proximate to the top of the virtual keyboard and a right-side bottom row proximate to the bottom of the virtual keyboard that each has only a single character key to elongate the right-side cluster of character keys in a vertical direction parallel to the central axis, wherein the character keys generally depict a perimeter of the right-side cluster as approximating an oval shape with character keys forming the perimeter of the right-side cluster being disposed on a boundary of the oval shape in a alphabetical order of the writing system, wherein:

the left-side keyboard section and the right-side keyboard section are spaced apart; and a flip key within the keyboard for switching the left-side cluster of character keys with the right-side cluster of character keys.

12. The non-transitory computer-readable storage medium of claim 11, wherein the left-side cluster includes left-side inner alphabetically-ordered character keys that are character keys in an inner part of the left-side cluster and that are arranged in a line in alphabetical order according to an alphabet, and wherein the right-side cluster includes right-side inner alphabetically-ordered character keys that are character keys in an inner part of the right-side cluster and that are arranged in a line in alphabetical order according to said alphabet.

13. The non-transitory computer-readable storage medium of claim 12, wherein either:

the character keys forming the perimeter of the left-side cluster are each ordered in the alphabet before any of the left-side inner alphabetically-ordered character keys, the left-side inner alphabetically-ordered character keys are each ordered in the alphabet before any of the character keys forming the perimeter of the right-side cluster, and the character keys forming the perimeter of the right-side cluster are each ordered in the alphabet before any of the right-side inner alphabetically-ordered character keys; or the character keys forming the perimeter of the right-side cluster are each ordered in the alphabet before any of the right-side inner alphabetically-ordered character keys, the right-side inner alphabetically-ordered character keys are each ordered in the alphabet before any of the character keys forming the perimeter of the left-side cluster, and the character keys forming the perimeter of the left-side cluster are each ordered in the alphabet before any of the left-side inner alphabetically-ordered character keys.

14. The non-transitory computer-readable storage medium of claim 11:

wherein the left-side rows further include:
a widest left-side row that is between the left-side top row and the left-side bottom row, that has two or more character keys, and that is the widest among the left-side rows in terms of a distance spanned by character keys in the left-side row or in terms of inter-character spacing;
an upper intermediate left-side row that is between the widest left-side row and the left-side top row, that has two or more character keys, and that is narrower than the widest left-side row in terms of a distance spanned by character keys in the left-side row or in terms of inter-character spacing; and
a lower intermediate left-side row that is between the widest left-side row and the left-side bottom row, that has two or more character keys, and that is narrower than the widest left-side row in terms of a distance spanned by character keys in the left-side row or in terms of inter-character spacing; and wherein the right-side rows further include:
a widest right-side row that is between the right-side top row and the right-side bottom row, that has two or more character keys, and that is the widest among the right-side rows in terms of a distance spanned by character keys in the right-side row or in terms of inter-character spacing;
an upper intermediate right-side row that is between the widest right-side row and the right-side top row, that has two or more character keys, and that is narrower than the widest right-side row in terms of a distance spanned by character keys in the right-side row or in terms of inter-letter spacing; and
a lower intermediate right-side row that is between the widest right-side row and the right-side bottom row, that has two or more character keys, and that is narrower than the widest right-side row in terms of a distance spanned by character keys in the right-side row or in terms of inter-character spacing.

15. The non-transitory computer-readable storage medium of claim 14, wherein the left-side rows further include a further lower intermediate left-side row that is between the lower intermediate left-side row and the left-side bottom row, that has two or more character keys, and that is narrower than the lower intermediate left-side row in terms of a distance spanned by character keys in the left-side row or in terms of inter-character spacing, and wherein the right-side rows further include a further lower intermediate right-side row that is between the lower intermediate right-side row and the right-side bottom row, that has two or more character keys, and that is narrower than the lower intermediate right-side row in terms of a distance spanned by character keys in the right-side row or in terms of inter-character spacing.

16. The non-transitory computer-readable storage medium of claim 11:

wherein the single character key in each of the left-side top row and the left-side bottom row is centered on a left-side axis extending between the left-side top row and the left-side bottom row, and wherein the single character key in each of the right-side top row and the right-side bottom row is centered on a right-side axis extending between the right-side top row and the right-side bottom row;

wherein each left-side intermediate row between the left-side top row and the left-side bottom row includes at least an outermost left-side character key and an outermost right-side character key, wherein the outermost left-side character key is offset the farthest left from the left-side axis among all character keys in the left-side intermediate row, and wherein the outermost right-side character key is offset the farthest right from the left-side axis among all character keys in the left-side intermediate row;

wherein the perimeter of the left-side cluster is formed from the single character key in the left-side top row, the single character key in the left-side bottom row, and the outermost left-side character key and the outermost right-side character key in each left-side intermediate row;

wherein each right-side intermediate row between the right-side top row and the right-side bottom row includes at least an outermost left-side character key and an outermost right-side character key, wherein the outermost left-side character key is offset the farthest left from the right-side axis among all character keys in the right-side intermediate row, and wherein the outermost right-side character key is offset the farthest right from the right-side axis among all character keys in the right-side intermediate row; and wherein the perimeter of the right-side cluster is formed from the single character key in the right-side top row, the single character key in the right-side bottom row, and the outermost left-side character key and the outermost right-side character key in each right-side intermediate row.

17. The non-transitory computer-readable storage medium of claim 11, wherein the left-side rows include the left-side top row, the left-side bottom row, and four left-side intermediate rows between the left-side top row and the left-side bottom row, wherein at least three of the four left-side intermediate rows includes three or more character keys, wherein the right-side rows include the right-side top row, the right-side bottom row, and four right-side intermediate rows between the right-side top row and the right-side bottom row, wherein at least three of the four right-side intermediate rows includes three or more character keys.

18. The non-transitory computer-readable storage medium of claim 11, wherein the single character keys in the left-side top row, the left-side bottom row, the right-side top row, and the right-side bottom row have a common visual characteristic that visually distinguishes the single character keys from character keys in an inner part of the left-side cluster and from character keys in an inner part of the right-side cluster, wherein at least some of the character keys forming the perimeter of the left-side cluster also have the common visual characteristic, and wherein at least some of the character keys forming the perimeter of the right-side cluster also have the common visual characteristic.

19. The non-transitory computer-readable storage medium of claim 11:
wherein the single character key in the left-side top row is an 'a' key;
wherein the left-side rows further include:
a second left-side row that is below the left-side top row and that, from left to right, includes a 'j' key, a 'k' key, and a 'b' key;
a third left-side row that is below the second left-side row and that, from left to right, includes an 'i' key, an 'l' key, and a 'c' key;
a fourth left-side row that is below the third left-side row and that, from left to right, includes an 'h' key, an 'm' key, and a 'd' key;
a fifth left-side row that is below the fourth left-side row, that is above the left-side bottom row, and that, from left to right, includes a 'g' key and an 'e' key;
wherein the single character key in the left-side bottom row is an 'f' key;
wherein the single character key in the right-side top row is an 'n' key;
wherein the right-side rows further include:
a second right-side row that is below the right-side top row and that, from left to right, includes a 'w' key, an 'x' key, and an 'o' key;
a third right-side row that is below the second right-side row and that, from left to right, includes a 'v' key, a 'y' key, and a 'p' key;
a fourth right-side row that is below the third right-side row and that, from left to right, includes a 'u' key, a 'z' key, and a 'q' key;
a fifth right-side row that is below the fourth right-side row, that is above the right-side bottom row, and that, from left to right, includes a 't' key and an 'r' key; and
wherein the single character key in the right-side bottom row is an 's' key.

20. The non-transitory computer-readable storage medium of claim 11 further including program code for providing a URL keyboard with a plurality of keys each providing quick-link access to web services.

* * * * *